US007820744B2

(12) United States Patent
Gugumus

(10) Patent No.: US 7,820,744 B2
(45) Date of Patent: Oct. 26, 2010

(54) STABILIZER MIXTURES

(75) Inventor: François Gugumus, Allschwil (CH)

(73) Assignee: Ciba Specialty Chemicals Corp., Tarrytown, NY (US)

( * ) Notice: Subject to any disclaimer, the term of this patent is extended or adjusted under 35 U.S.C. 154(b) by 0 days.

(21) Appl. No.: 12/607,102

(22) Filed: Oct. 28, 2009

(65) Prior Publication Data

US 2010/0048774 A1 Feb. 25, 2010

Related U.S. Application Data

(63) Continuation of application No. 12/317,014, filed on Dec. 18, 2008, which is a continuation of application No. 11/498,351, filed on Aug. 3, 2006, now abandoned, which is a continuation of application No. 11/052,714, filed on Jan. 19, 2005, now abandoned, which is a continuation of application No. 10/276,120, filed as application No. PCT/EP01/05865 on May 22, 2001, now abandoned.

(30) Foreign Application Priority Data

May 31, 2000 (EP) .................................. 00810482
Jul. 10, 2000 (EP) .................................. 00810600

(51) Int. Cl.
*C08K 5/3492* (2006.01)
*C08K 5/3435* (2006.01)
*C08K 5/3462* (2006.01)
*C08K 5/35* (2006.01)
*C09K 15/30* (2006.01)

(52) U.S. Cl. ........................... 524/100; 524/89; 524/99; 524/102; 524/103; 252/401; 252/403

(58) Field of Classification Search ................. 252/401, 252/403; 524/89, 99, 100, 102, 103
See application file for complete search history.

(56) References Cited

U.S. PATENT DOCUMENTS

| | | | | | |
|---|---|---|---|---|---|
| 3,640,928 | A | * | 2/1972 | Murayama et al | 524/99 |
| 4,110,306 | A | * | 8/1978 | Minagawa et al. | 524/102 |
| 4,198,334 | A | * | 4/1980 | Rasberger | 524/102 |
| 4,233,412 | A | * | 11/1980 | Rody et al. | 525/167 |
| 4,292,240 | A | * | 9/1981 | Lai et al. | 540/492 |
| 4,340,534 | A | * | 7/1982 | Wiezer et al. | 524/99 |
| 4,356,307 | A | * | 10/1982 | Kelkenberg et al. | 546/200 |
| 4,408,051 | A | * | 10/1983 | Hinsken et al. | 546/19 |
| 4,547,538 | A | * | 10/1985 | Lai et al. | 524/100 |
| 4,619,956 | A | * | 10/1986 | Susi | 524/87 |
| 4,619,958 | A | * | 10/1986 | Haruna et al. | 524/102 |

(Continued)

FOREIGN PATENT DOCUMENTS

| | | |
|---|---|---|
| EP | 0476612 | 3/1992 |
| EP | 0632092 | 1/1995 |
| EP | 0728806 | 8/1996 |
| GB | 2328210 | 2/1999 |
| GB | 2354245 | 3/2001 |
| WO | 97/39051 | 10/1997 |
| WO | 00/18833 | 4/2000 |

OTHER PUBLICATIONS

Derwent Abstr. 2001-301887/32 for EP 1078929 (2001).

*Primary Examiner*—Kriellion A Sanders
(74) *Attorney, Agent, or Firm*—Shiela A. Loggins

(57) ABSTRACT

A stabilizer mixture containing the components (A) and (B) wherein component (A) is for example a compound of the formula (A-1)

(A-1)

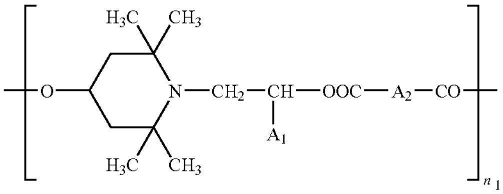

wherein $A_1$ is hydrogen or $C_1$-$C_4$alkyl, $A_2$ is a direct bond or $C_1$-$C_{10}$alkylene, and $n_1$ is a number from 2 to 50; and component (B) is formed by two different low molecular weight sterically hindered amine compounds containing a group of the formula (I) or (II);

(I)

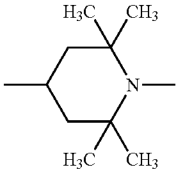

(II)

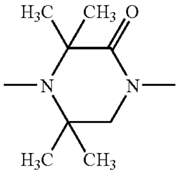

with the proviso that components (A) and (B) are different.

12 Claims, No Drawings

U.S. PATENT DOCUMENTS 4,689,416 A * 8/1987 Ertl et al. ...................... 546/19
4,692,486 A 9/1987 Gugumus .................. 524/100
4,769,457 A * 9/1988 Helwig et al. .............. 544/180
4,863,981 A * 9/1989 Gugumus ................... 524/97
4,965,301 A 10/1990 Leininger .................. 524/101
4,976,889 A * 12/1990 Aumueller et al. .......... 252/403
5,026,849 A * 6/1991 Kletecka et al. ............ 544/198
5,049,604 A * 9/1991 Fujii et al. ................. 524/103
5,051,458 A * 9/1991 Costanzi et al. ............... 524/99
5,071,981 A * 12/1991 Son et al. .................... 544/198
5,182,390 A * 1/1993 Sagawa et al. .............. 544/222
5,204,473 A * 4/1993 Winter et al. ............... 546/188
5,679,733 A * 10/1997 Malik et al. ................... 524/99
5,719,217 A * 2/1998 Gugumus ................... 524/100
5,919,399 A * 7/1999 Gugumus ................... 252/403
5,965,643 A * 10/1999 Gugumus ................... 524/100
5,980,783 A * 11/1999 Gugumus ................... 252/401
6,015,849 A * 1/2000 Gugumus ................... 524/100
6,020,406 A * 2/2000 Gugumus .................... 524/95

* cited by examiner

STABILIZER MIXTURES

This application is a continuation of copending application Ser. No. 12/317,014, filed on Dec. 18, 2008 which is a continuation of Ser. No. 11/498,351, filed Aug. 3, 2006 now abandoned which is a continuation of application Ser. No. 11/052,714, filed Jan. 19, 2005, now abandoned which is a continuation of application Ser. No. 10/276,120, filed Nov. 11, 2002, now abandoned, which is the National Stage of International Application PCT/EP01/05865, filed May 22, 2001, the contents of which are herein incorporated by reference.

The present invention relates to a stabilizer mixture containing a specific sterically hindered amine ester or amide, and two different low molecular weight sterically hindered amines.

Stabilizer mixtures containing blends of sterically hindered amines are for example described in U.S. Pat. No. 4,692,468, U.S. Pat. No. 4,863,981, U.S. Pat. No. 5,719,217, U.S. Pat. No. 5,919,399, U.S. Pat. No. 5,965,643, U.S. Pat. No. 5,980,783, U.S. Pat. No. 6,015,849 and U.S. Pat. No. 6,020,406.

The present invention relates to a stabilizer mixture containing the components (A) and (B) wherein component (A) is a compound of the formula (A-1)

(A-1)

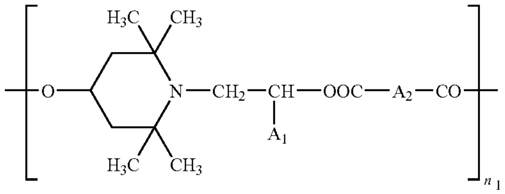

wherein $A_1$ is hydrogen or $C_1$-$C_4$alkyl, $A_2$ is a direct bond or $C_1$-$C_{10}$alkylene, and $n_1$ is a number from 2 to 50;

at least one compound of the formulae (A-2-a) and (A-2-b)

(A-2-a)

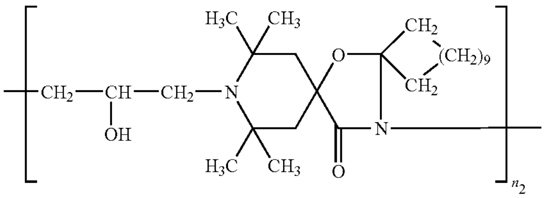

(A-2-b)

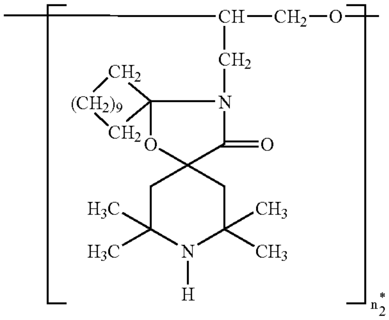

wherein $n_2$ and $n_2$* are a number from 2 to 50;

a compound of the formula (A-3)

(A-3)

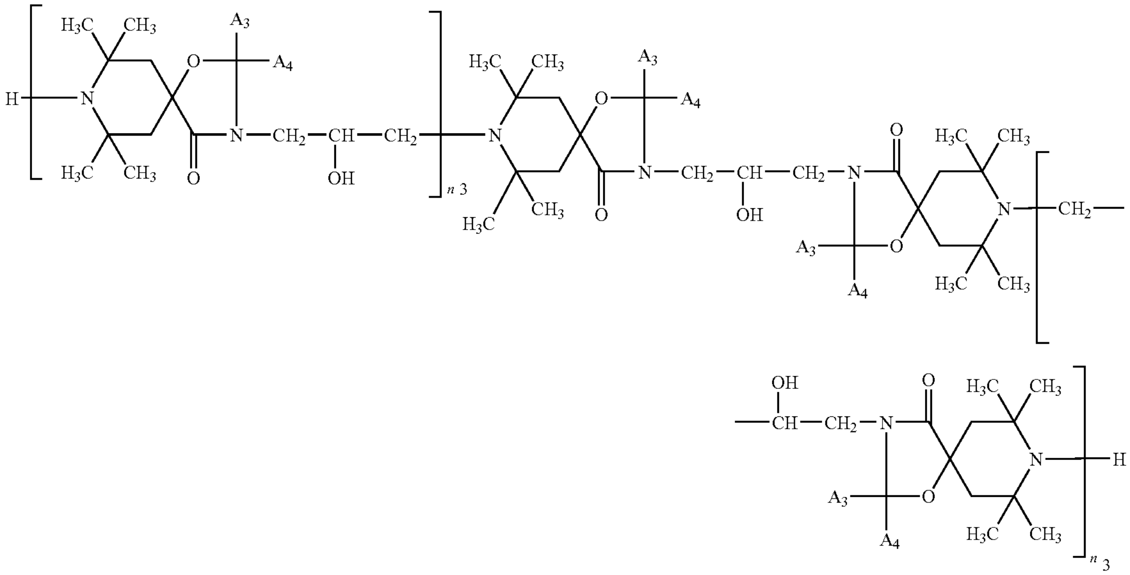

wherein $A_3$ and $A_4$ independently of one another are hydrogen or $C_1$-$C_8$alkyl, or $A_3$ and $A_4$ together form a $C_2$-$C_{14}$alkylene group, and the variables $n_3$ independently of one another are a number from 1 to 50; or a compound of the formula (A-4)

(A-4)

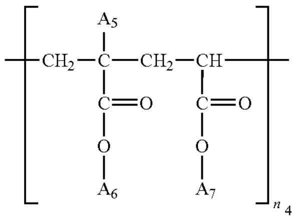

wherein $n_4$ is a number from 2 to 50, $A_5$ is hydrogen or $C_1$-$C_4$alkyl, the radicals $A_6$ and $A_7$ independently of one another are $C_1$-$C_4$alkyl or a group of the formula (a-I)

(a-I)

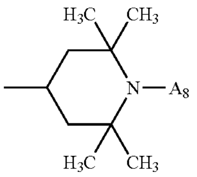

wherein $A_8$ is hydrogen, $C_1$-$C_8$alkyl, $O^-$, —OH, —$CH_2CN$, $C_1$-$C_{18}$alkoxy, $C_5$-$C_{12}$cycloalkoxy, $C_3$-$C_8$alkenyl, $C_7$-$C_9$-phenylalkyl unsubstituted or substituted on the phenyl by 1, 2 or 3 $C_1$-$C_4$alkyl; or $C_1$-$C_8$acyl, with the proviso that at least 50% of the radicals $A_7$ are a group of the formula (a-I), and component (B) is formed by two different low molecular weight sterically hindered amine compounds containing a group of the formula (I) or (II);

(I)

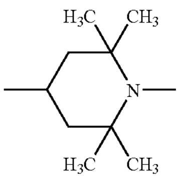

(II)

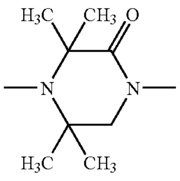

with the proviso that components (A) and (B) are different.

Preferably the compounds of component (B) have a molecular weight up to 1,000 g/mol, for example 155 to 800 g/mol or 155 to 1,000 g/mol or 300 to 800 g/mol or 300 to 1,000 g/mol.

The two different compounds of component (B) are preferably selected from the group consisting of the following classes β-1) a compound of the formula (B-1)

(B-1)

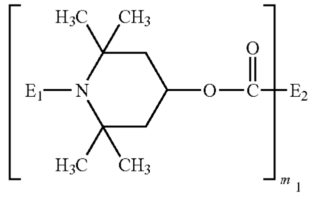

in which $E_1$ is hydrogen, $C_1$-$C_8$alkyl, $O^-$, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, $m_1$ is 1, 2 or 4, if $m_1$ is 1, $E_2$ is $C_1$-$C_{25}$alkyl, if $m_1$ is 2, $E_2$ is $C_1$-$C_{14}$alkylene or a group of the formula (b-I)

(b-I)

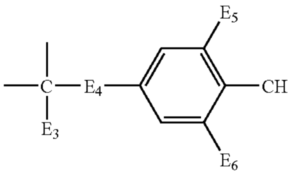

wherein $E_3$ is $C_1$-$C_{10}$alkyl or $C_2$-$C_{10}$alkenyl, $E_4$ is $C_1$-$C_{10}$alkylene, and $E_5$ and $E_6$ independently of one another are $C_1$-$C_4$alkyl, cyclohexyl or methylcyclohexyl, and if $m_1$ is 4, $E_2$ is $C_4$-$C_{10}$alkanetetrayl;

β-2) a compound of the formula (B-2)

(B-2)

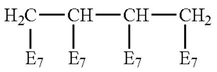

in which two of the radicals $E_7$ are —COO—($C_1$-$C_{20}$alkyl), and two of the radicals $E_7$ are a group of the formula (b-II)

(b-II)

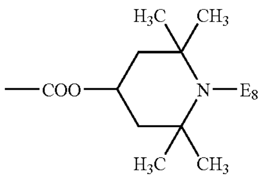

with $E_8$ having one of the meanings of $E_1$;

β-3) a compound of the formula (B-3)

(B-3)

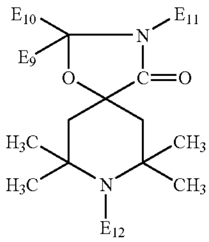

in which $E_9$ and $E_{10}$ together form $C_2$-$C_{14}$alkylene, $E_{11}$ is hydrogen or a group —$Z_1$—COO—$Z_2$, $Z_1$ is $C_2$-$C_{14}$alkylene, and $Z_2$ is $C_1$-$C_{24}$alkyl, and $E_{12}$ has one of the meanings of $E_1$;

β-4) a compound of the formula (B-4)

(B-4)

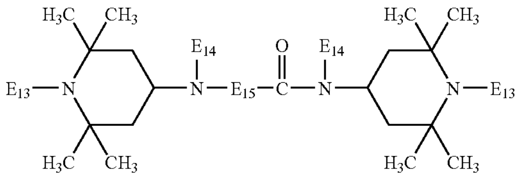

wherein the radicals $E_{13}$ independently of one another have one of the meanings of $E_1$, the radicals $E_{14}$ independently of one another are hydrogen or $C_1$-$C_{12}$alkyl, and $E_{15}$ is $C_1$-$C_{10}$alkylene or $C_3$-$C_{10}$alkylidene;

β-5) a compound of the formula (B-5)

(B-5)

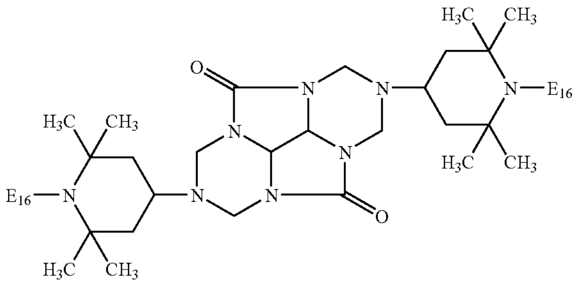

wherein the radicals $E_{16}$ independently of one another have one of the meanings of $E_1$;

β-6) a compound of the formula (B-6)

(B-6)

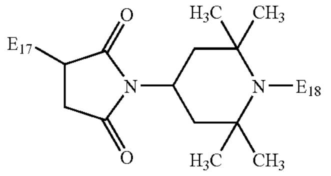

in which $E_{17}$ is $C_1$-$C_{24}$alkyl, and $E_{18}$ has one of the meanings of $E_1$;

(β-7) a compound of the formula (B-7)

(B-7)

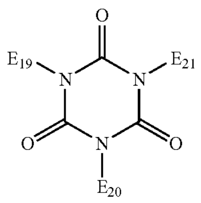

in which $E_{19}$, $E_{20}$ and $E_{21}$ independently of one another are a group of the formula (b-III)

(b-III)

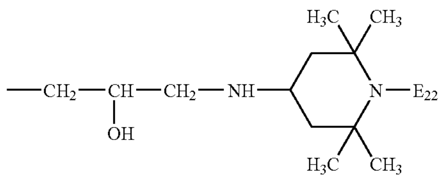

wherein $E_{22}$ has one of the meanings of $E_1$;

β-8) a compound of the formula (B-8)

(B-8)

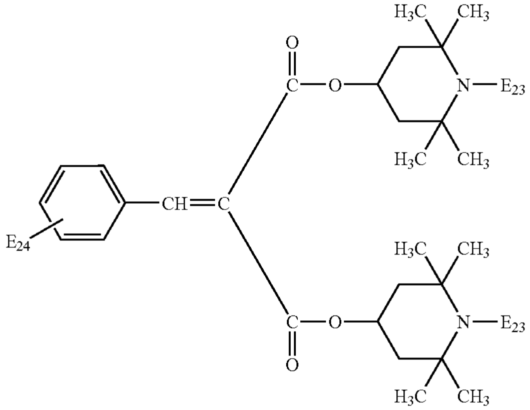

wherein the radicals $E_{23}$ independently of one another have one of the meanings of $E_1$, and $E_{24}$ is hydrogen, $C_1$-$C_{12}$alkyl or $C_1$-$C_{12}$alkoxy;

β-9) a compound of the formula (B-9)

(B-9)

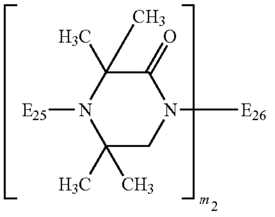

wherein $m_2$ is 1, 2 or 3, $E_{25}$ has one of the meanings of $E_1$, and when $m_2$ is 1, $E_{26}$ is a group

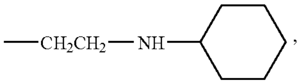

when $m_2$ is 2, $E_{26}$ is $C_2$-$C_{22}$alkylene, and when $m_2$ is 3, $E_{26}$ is a group of the formula (b-IV)

(b-IV)

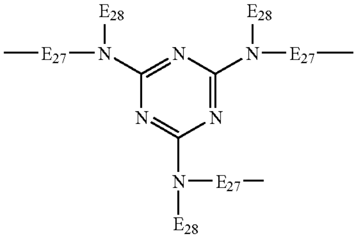

wherein the radicals $E_{27}$ independently of one another are $C_2$-$C_{12}$alkylene, and the radicals $E_{28}$ independently of one another are $C_1$-$C_{12}$alkyl or $C_5$-$C_{12}$cycloalkyl;

β-10) a compound of the formula (B-10)

(B-10)

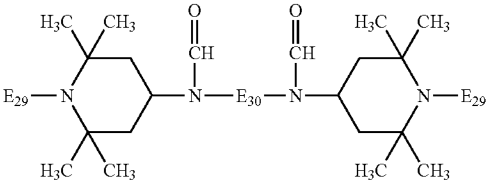

wherein the radicals $E_{29}$ independently of one another have one of the meanings of $E_1$, and $E_{30}$ is $C_2$-$C_{22}$alkylene, $C_5$-$C_7$cycloalkylene, $C_1$-$C_4$alkylenedi($C_5$-$C_7$cycloalkylene), phenylene or phenylenedi($C_1$-$C_4$alkylene); or β-11) a compound of the formula (B-11)

(B-11)

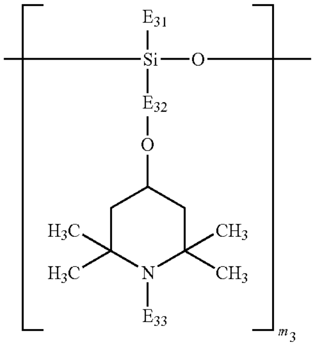

in which $E_{31}$ is $C_1$-$C_{10}$alkyl, $C_5$-$C_{12}$cycloalkyl, $C_1$-$C_4$alkyl-substituted $C_5$-$C_{12}$cycloalkyl, phenyl or $C_1$-$C_{10}$alkyl-substituted phenyl, $E_{32}$ is $C_3$-$C_{10}$alkylene, $E_{33}$ has one of the meanings of $E_1$, and $m_3$ is a number from 2 to 6.

One of the preferred embodiments of this invention relates to stabilizer mixtures wherein the two compounds of component (B) are selected from different classes.

Examples of component (B) are

A compound selected from the class β-1 and a compound selected from the class β-3, β-4, β-5, β-6, β-7, β-8, β-9, β-10 or β-11, preferably the class β-3, β-5, β-6, β-10 or β-11.

A compound selected from the class β-3 and a compound selected from the class β-4, β-5, β-6, β-7, β-9, β-10 or β-11, preferably β-5, β-6, β-10 or β-11.

A compound selected from the class β-5 and a compound selected from the class β-6, β-7, β-8, β-9, β-10 or β-11, preferably β-6, β-10 or β-11.

A compound selected from the class β-6 and a compound selected from the class β-10 or β-11.

A compound selected from the class β-7 and a compound selected from the class β-8, β-10 or β-11.

A compound selected from the class β-9 and a compound selected from the class β-10 or β-11.

A compound selected from the class β-10 and a compound selected from the class β-11.

Examples of alkyl having up to 25 carbon atoms are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl. One of the preferred definitions of $A_8$, $E_1$, $E_8$, $E_{12}$, $E_{13}$, $E_{16}$, $E_{18}$, $E_{22}$, $E_{23}$, $E_{25}$, $E_{29}$ and $E_{33}$ is $C_1$-$C_4$alkyl, especially methyl.

Examples of alkoxy having up to 18 carbon atoms are methoxy, ethoxy, propoxy, isopropoxy, butoxy, isobutoxy, pentoxy, isopentoxy, hexoxy, heptoxy, octoxy, decyloxy, dodecyloxy, tetradecyloxy, hexadecyloxy and octadecyloxy. One of the preferred meanings of $E_1$ is octoxy. $E_{24}$ is preferably $C_1$-$C_4$alkoxy.

Examples of $C_5$-$C_{12}$cycloalkyl are cyclopentyl, 6-cyclohexyl, cycloheptyl, cyclooctyl and cyclododecyl. $C_5$-$C_8$Cycloalkyl, especially cyclohexyl, is preferred.

$C_1$-$C_4$Alkyl-substituted $C_5$-$C_{12}$cycloalkyl is for example methylcyclohexyl or dimethylcyclohexyl.

Examples of $C_5$-$C_{12}$cycloalkoxy are cyclopentoxy, cyclohexoxy, cycloheptoxy, cyclooctoxy, cyclodecyloxy and cyclododecyloxy. $C_5$-$C_8$Cycloalkoxy, in particular cyclopentoxy and cyclohexoxy, is preferred.

$C_1$-$C_{10}$Alkyl-substituted phenyl is for example methylphenyl, dimethylphenyl, trimethylphenyl or tert-butylphenyl.

Examples of $C_7$-$C_9$phenylalkyl are benzyl and phenylethyl.

$C_7$-$C_9$Phenylalkyl which is substituted on the phenyl radical by 1, 2 or 3 $C_1$-$C_4$alkyl is for example methylbenzyl, dimethylbenzyl, trimethylbenzyl or tert-butylbenzyl.

Examples of alkenyl having up to 10 carbon atoms are allyl, 2-methallyl, butenyl, pentenyl and hexenyl. Allyl is preferred. The carbon atom in position 1 is preferably saturated.

Examples of acyl containing not more than 8 carbon atoms are formyl, acetyl, propionyl, butyryl, pentanoyl, hexanoyl, heptanoyl, octanoyl, acryloyl, methacryloyl and benzoyl. $C_1$-$C_8$Alkanoyl, $C_3$-$C_8$alkenyl and benzoyl are preferred. Acetyl and acryloyl are especially preferred.

Examples of alkylene having up to 22 carbon atoms are methylene, ethylene, propylene, trimethylene, tetramethylene, pentamethylene, 2,2-dimethyltrimethylene, hexamethylene, trimethylhexamethylene, octamethylene and decamethylene.

An example of $C_3$-$C_{10}$alkylidene is the group

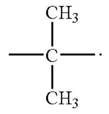

An example of $C_4$-$C_{10}$alkanetetrayl is 1,2,3,4-butanetetrayl.

An example of $C_5$-$C_7$cycloalkylene is cyclohexylene.

An example of $C_1$-$C_4$alkylenedi($C_5$-$C_7$cycloalkylene) is methylenedicyclohexylene.

An example of phenylenedi($C_1$-$C_4$alkylene) is methylene-phenylene-methylene or ethylene-phenylene-ethylene.

$n_1$, $n_2$, $n_2$* and $n_4$ are preferably a number from 2 to 25, in particular 2 to 20.

$n_3$ is preferably a number from 1 to 25, in particular 1 to 20.

$m_3$ is preferably a number from 2 to 6 or 2 to 5, in particular 2 to 4.

The compounds described above as components (A) and (B) are essentially known and commercially available. All of them can be prepared by known processes.

The preparation of the compounds of component (A) is disclosed for example in U.S. Pat. No. 4,233,412, U.S. Pat. No. 4,340,534, WO-A-98/51,690 and EP-A-1,803.

The preparation of the compounds of component (B) is disclosed for example in U.S. Pat. No. 5,679,733, U.S. Pat. No. 3,640,928, U.S. Pat. No. 4,198,334, U.S. Pat. No. 5,204,473, U.S. Pat. No. 4,619,958, U.S. Pat. No. 4,110,306, U.S. Pat. No. 4,110,334, U.S. Pat. No. 4,689,416, U.S. Pat. No. 4,408,051, SU-A-768,175 (Derwent 88-138,751/20), U.S. Pat. No. 5,049,604, U.S. Pat. No. 4,769,457, U.S. Pat. No. 4,356,307, U.S. Pat. No. 4,619,956, U.S. Pat. No. 5,182,390, GB-A-2,269,819, U.S. Pat. No. 4,292,240, U.S. Pat. No. 5,026,849, U.S. Pat. No. 5,071,981, U.S. Pat. No. 4,547,538, U.S. Pat. No. 4,976,889 and U.S. Pat. No. 5,051,458. Component (A) is preferably TINUVIN 622®, HOSTAVIN N 30® or FERRO AM 806®.

The compounds of component (B) are preferably selected from the group consisting of DASTIB 845®, TINUVIN 770®, TINUVIN 765®, TINUVIN 144®, TINUVIN 123®, ADK STAB LA 52®, ADK STAB LA 57®, ADK STAB LA 62®, ADK STAB LA 67®, HOSTAVIN N 20®, HOSTAVIN N 24®, SANDUVOR 3050®, DIACETAM 5®, SUMISORB TM 61®, UVINUL 4049®, SANDUVOR PR 31®, GOODRITE UV 3034®, GOODRITE UV 3150®, GOODRITE UV 3159®, GOODRITE 3110 x 128®, UVINUL 4050H®, UVASIL 299 LM® and UVASIL 2000 LM®.

The meanings of the terminal groups which saturate the free valences in the compounds of the formulae (A-1), (A-2-a), (A-2-b), (A-4) and (B-11) depend on the processes used for their preparation. The terminal groups can also be modified after the preparation of the compounds.

If the compounds of the formula (A-1) are prepared, for example, by reacting a compound of the formula

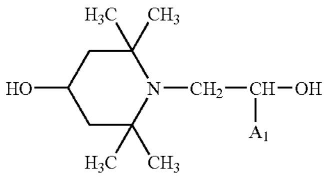

in which $A_1$ is hydrogen or methyl, with a dicarboxylic acid diester of the formula Y—OOC-$A_2$-COO—Y, in which Y is, for example, methyl, ethyl or propyl, and $A_2$ is as defined above, the terminal group bonded to the 2,2,6,6-tetramethyl-4-oxypiperidin-1-yl radical is hydrogen or —CO-$A_2$-COO—Y, and the terminal group bonded to the diacyl radical is —O—Y or

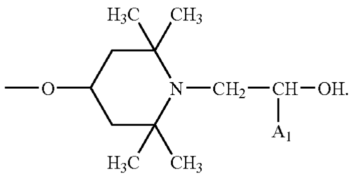

In the compounds of the formula (A-2-a), the terminal group bonded to the nitrogen can be, for example, hydrogen and the terminal group bonded to the 2-hydroxypropylene radical can be, for example, a

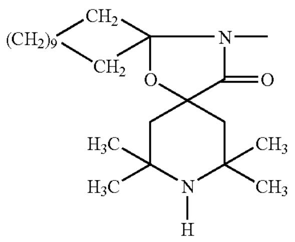

group.

In the compounds of the formula (A-2-b), the terminal group bonded to the dimethylene radical can be, for example, —OH, and the terminal group bonded to the oxygen can be, for example, hydrogen. The terminal groups can also be polyether radicals.

In the compounds of the formula (A-4), the end group bonded to the —$CH_2$— residue can be, for example, hydrogen and the end group bonded to the —$CH(CO_2A_7)$ residue can be, for example, —CH═CH—$COOA_7$.

In the compounds of the formula (B-11), the terminal group bonded to the silicon atom can be, for example, $(E_{31})_3$Si—O—, and the terminal group bonded to the oxygen can be, for example, —$Si(E_{31})_3$.

The compounds of the formula (B-11) can also be in the form of cyclic compounds If $m_3$ is a number from 3 to 6, i.e. the free valences shown in the structural formula then form a direct bond.

$A_8$ is preferably hydrogen, $C_1$-$C_4$alkyl, $C_1$-$C_{10}$alkoxy, cyclohexyloxy, allyl, benzyl or acetyl.

$E_1$, $E_8$, $E_{12}$, $E_{13}$, $E_{16}$, $E_{18}$, $E_{22}$, $E_{23}$, $E_{25}$, $E_{29}$ and $E_{33}$ are preferably hydrogen, $C_1$-$C_4$alkyl, $C_1$-$C_{10}$alkoxy, cyclohexyloxy, allyl, benzyl or acetyl.

$A_8$, $E_1$, $E_8$, $E_{12}$, $E_{13}$, $E_{16}$, $E_{18}$, $E_{22}$, $E_{23}$, $E_{25}$, $E_{29}$ and $E_{33}$ are in particular hydrogen or methyl and $E_1$ additionally is $C_1$-$C_8$alkoxy.

According to a preferred embodiment $A_1$ is hydrogen or methyl, $A_2$ is a direct bond or $C_2$-$C_6$alkylene, and $n_1$ is a number from 2 to 25;

$n_2$ and $n_2$* are a number from 2 to 25;

$A_3$ and $A_4$ independently of one another are hydrogen or $C_1$-$C_4$alkyl, or $A_3$ and $A_4$ together form a $C_9$-$C_{13}$alkylene group, and the variables $n_3$ independently of one another are a number from 1 to 25;

$n_4$ is a number from 2 to 25, $A_5$ and $A_6$ independently of one another are $C_1$-$C_4$alkyl, and $A_7$ is $C_1$-$C_4$alkyl or a group of the formula (a-I)

with the proviso that at least 50% of the radicals $A_7$ are a group of the formula (a-I).

According to a further preferred embodiment $m_1$ is 1, 2 or 4, if $m_1$ is 1, $E_2$ is $C_{12}$-$C_{20}$alkyl, if $m_1$ is 2, $E_2$ is $C_2$-$C_{10}$alkylene or a group of the formula (b-I)

$E_3$ is $C_1$-$C_4$alkyl, $E_4$ is $C_1$-$C_6$alkylene, and $E_5$ and $E_6$ independently of one another are $C_1$-$C_4$alkyl, and if $m_1$ is 4, $E_2$ is $C_4$-$C_8$alkanetetrayl;

two of the radicals $E_7$ are —COO—($C_{10}$-$C_{15}$alkyl), and two of the radicals $E_7$ are a group of the formula (b-II);

$E_9$ and $E_{10}$ together form $C_9$-$C_{13}$alkylene, $E_{11}$ is hydrogen or a group —$Z_1$—COO—$Z_2$, $Z_1$ is $C_2$-$C_6$alkylene, and $Z_2$ is $C_{10}$-$C_{16}$alkyl;

$E_{14}$ is hydrogen, and $E_{16}$ is $C_2$-$C_6$alkylene or $C_3$-$C_5$alkylidene;

$E_{17}$ is $C_{10}$-$C_{14}$alkyl;

$E_{24}$ is $C_1$-$C_4$alkoxy;

$m_2$ is 1, 2 or 3, when $m_2$ is 1, $E_{26}$ is a group

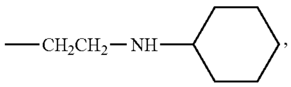

, when $m_2$ is 2, $E_{26}$ is $C_2$-$C_6$alkylene, and when $m_2$ is 3, $E_{26}$ is a group of the formula (b-IV)

the radicals $E_{27}$ independently of one another are $C_2$-$C_6$alkylene, and the radicals $E_{28}$ independently of one another are $C_1$-$C_4$alkyl or $C_6$-$C_8$cycloalkyl;

$E_{30}$ is $C_2$-$C_6$alkylene; and $E_{31}$ is $C_1$-$C_4$alkyl, $E_{32}$ is $C_3$-$C_6$alkylene, and $m_3$ is a number from 2 to 6.

A particularly preferred embodiment of this invention relates to a stabilizer mixture wherein component (A) is a compound of the formula (A-1-a), (A-2-a), (A-2-b), (A-3-a) or (A-4-a);

(A-1-a)

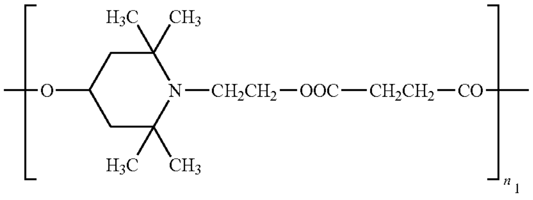

wherein $n_1$ is a number from 2 to 20;

(A-2-a)

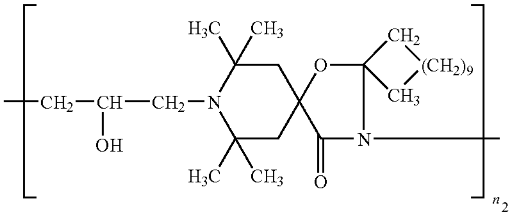

(A-2-b)

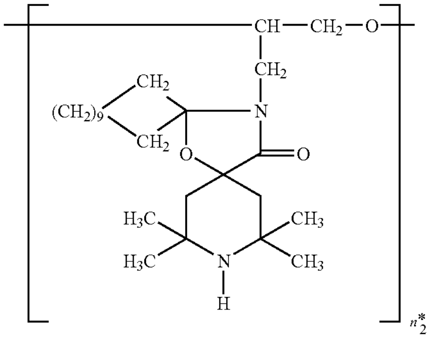

wherein $n_2$ and $n_2^*$ are a number from 2 to 20;

(A-3-a)

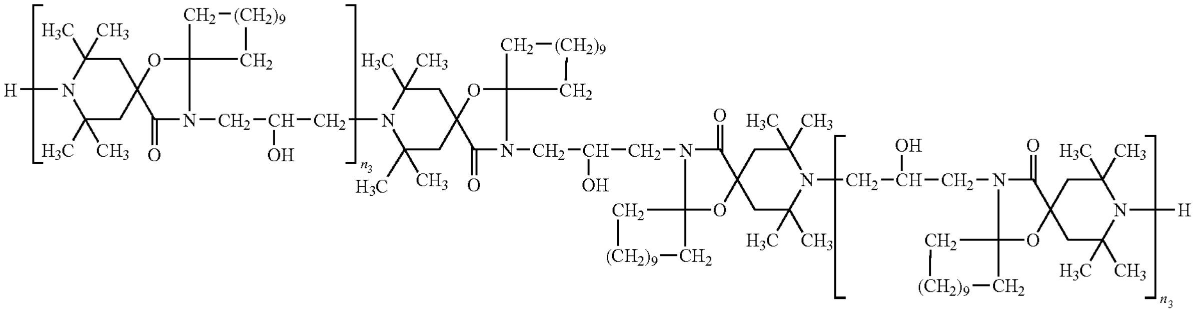

wherein the variables $n_3$ independently of one another are a number from 1 to 20;

(A-4-a)

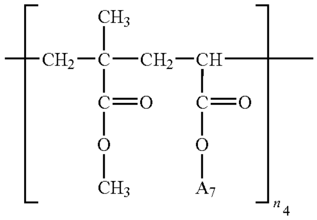

wherein $n_4$ is a number from 2 to 20, and at least 50% of the radicals $A_7$ are a group of the formula (a-I)

(a-I)

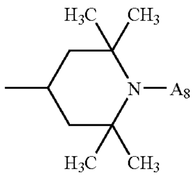

wherein $A_8$ is hydrogen, $C_1$-$C_8$alkyl, $O^-$, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl, and the remaining radicals $A_7$ are ethyl; and component (B) is formed by two different compounds selected from the group consisting of compounds of the formulae (B-1-a), (B-1-b), (B-1-c), (B-1-d), (B-2-a), (B-3-a), (B-3-b), (B-4-a), (B-4-b), (B-5), (B-6-a), (B-7), (B-8-a), (B-9-a), (B-9-b), (B-9-c), (B-10-a) and (B-11-a);

(B-1-a)

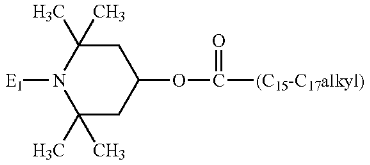

(B-1-b)

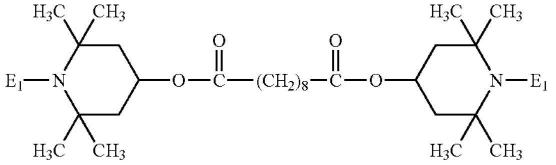

(B-1-c)

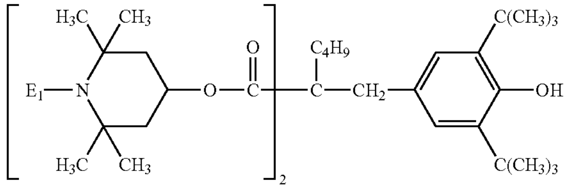

(B-1-d)

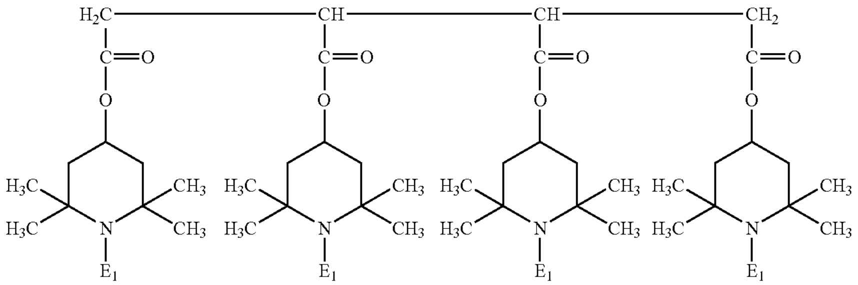

wherein $E_1$ is hydrogen, $C_1$-$C_8$alkyl, $O^-$, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl, or $C_1$-$C_8$acyl;

(B-2-a)

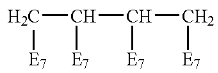

in which two of the radicals $E_7$ are —COO—$C_{13}H_{27}$ and two of the radicals $E_7$ are

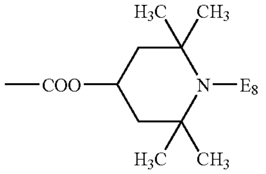
and $E_8$ has one of the meanings of $E_1$;
(B-3-a)
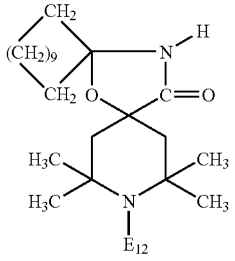
(B-3-b)
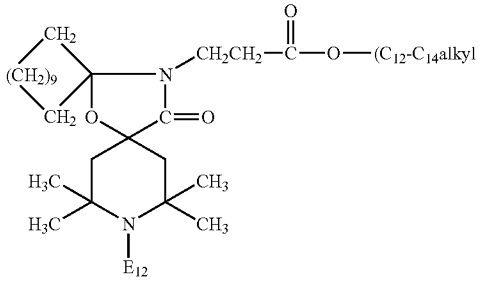
wherein $E_{12}$ has one of the meanings of $E_1$;
(B-4-a)
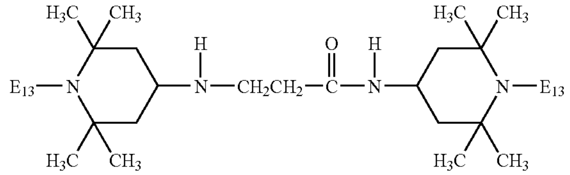
(B-4-b)
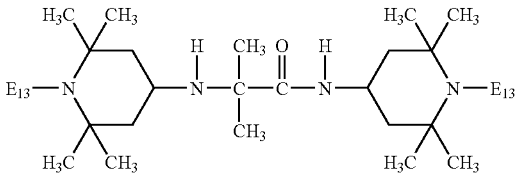
wherein $E_{13}$ has one of the meanings of $E_1$;
(B-5)
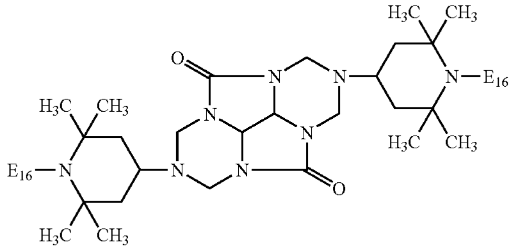
wherein $E_{16}$ has one of the meanings of $E_1$;
(B-6-a)
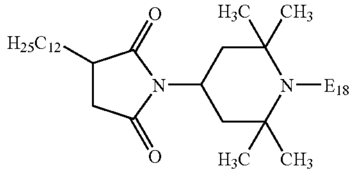
wherein $E_{18}$ has one of the meanings of $E_1$;
(B-7)
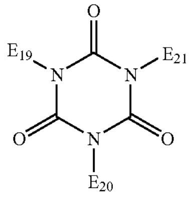
in which $E_{19}$, $E_{20}$ and $E_{21}$ independently of one another are a group of the formula (b-III)
(b-III)
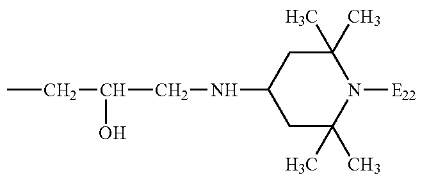

wherein $E_{22}$ has one of the meanings of $E_1$;

(B-8-a)

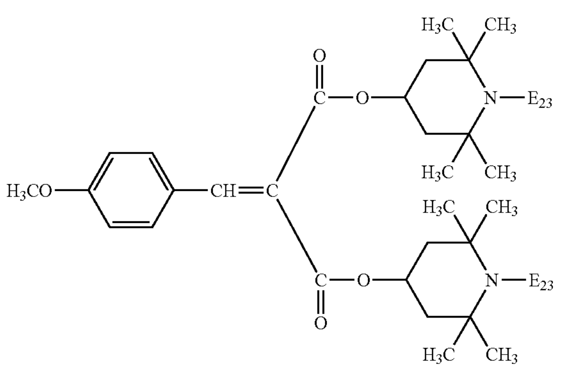

wherein $E_{23}$ has one of the meanings of $E_{11}$ wherein $E_{29}$ has one of the meanings of $E_1$;

(B-11-a)

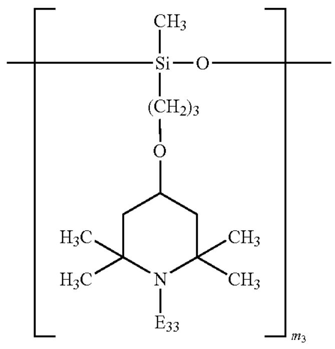

wherein $m_3$ is a number from 2 to 6 and $E_{33}$ has one of the meanings of $E_1$.

(B-9-a)

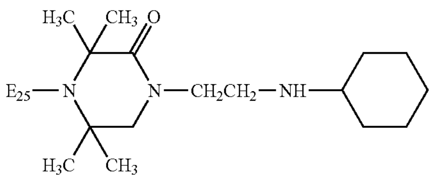

(B-9-b)

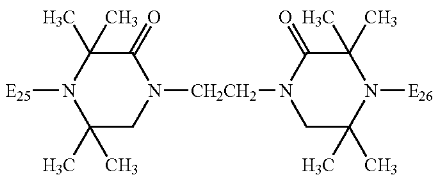

(B-9-c)

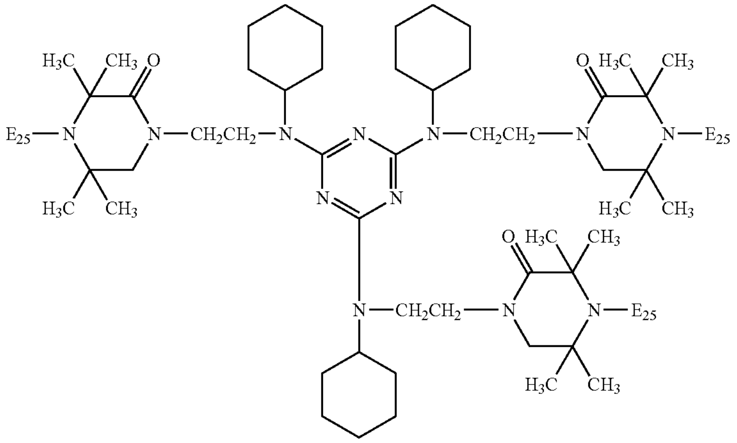

wherein $E_{25}$ has one of the meanings of $E_1$, (B-10-a)

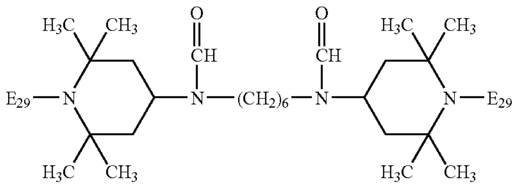

A particularly preferred embodiment of this invention also relates to a stabilizer mixture wherein one of the two different compounds forming component (B) is a compound of the formula (B-1-b) with $E_1$ being hydrogen.

Another preferred embodiment of this invention relates to a stabilizer mixture wherein component (A) is a compound of the formula (A-1-a) with $n_1$ being a number from 2 to 20 or a compound of the formula (A-2-a) or (A-2-b) wherein $n_2$ and $n_2$* are a number from 2 to 20; and one of the two different compounds forming component (B) is a compound of the formula (B-1-b) with $E_1$ being hydrogen.

A further particularly preferred embodiment of this invention is a stabilizer mixture wherein component (A) is a compound of the formula (A-1-a) with $n_1$ being a number from 2 to 20 or a compound of the formula (A-2-a) or (A-2-b) wherein $n_2$ and $n_2$* are a number from 2 to 20;

one of the two different compounds forming component (B) is a compound of the formula (B-1-b) with $E_1$ being hydrogen; and the other of the two different compounds forming component (B) is a compound of the formula (B-1-a) with $E_1$ being hydrogen, (B-1-b) with $E_1$ being methyl, (B-1-d) with $E_1$ being hydrogen or methyl, (B-3-a) with $E_{12}$ being hydrogen, (B-3-b) with $E_{12}$ being hydrogen, (B-4-b) with $E_{13}$ being hydrogen, (B-5) with $E_{16}$ being hydrogen, (B-6-a) with $E_{18}$ being hydrogen or methyl, (B-8-a) with $E_{23}$ being methyl, (B-9-c) with $E_{26}$ being hydrogen or methyl, (B-10-a) with $E_{29}$ being hydrogen, or (B-11-a) with $E_{33}$ being hydrogen.

Examples of stabilizer mixtures according to the present invention are the following combinations of commercial products:

1. TINUVIN 622®+TINUVIN 770®+TINUVIN 765®
2. TINUVIN 622®+TINUVIN 770®+TINUVIN 144®
3. TINUVIN 622®+TINUVIN 770®+TINUVIN 123®
4. TINUVIN 622®+TINUVIN 770®+compound of the formula (B-3-a) wherein $E_{12}$ is hydrogen
5. TINUVIN 622®+TINUVIN 770®+HOSTAVIN N 24®
6. TINUVIN 622®+TINUVIN 770®+DIACETAM 5®
7. TINUVIN 622®+TINUVIN 770®+ADK STAB LA 52®
8. TINUVIN 622®+TINUVIN 770®+ADK STAB LA 57®
9. TINUVIN 622®+TINUVIN 770®+ADK STAB LA 62®
10. TINUVIN 622®+TINUVIN 770®+ADK STAB LA 67®
11. TINUVIN 622®+TINUVIN 770®+GOODRITE UV 3034®
12. TINUVIN 622®+TINUVIN 770®+GOODRITE UV 3150®
13. TINUVIN 622®+TINUVIN 770®+GOODRITE UV 3159®
14. TINUVIN 622®+TINUVIN 770®+compound of the formula (B-9-a) wherein $E_{25}$ is hydrogen
15. TINUVIN 622®+TINUVIN 770®+UVINUL 4049®
16. TINUVIN 622®+TINUVIN 770®+compound of the formula (B-10-a) wherein $E_{29}$ is hydrogen
17. TINUVIN 622®+TINUVIN 770®+compound of the formula (B-1-a) wherein $E_1$ is hydrogen
18. TINUVIN 622®+TINUVIN 770®+SUMISORB TM 61®
19. TINUVIN 622®+TINUVIN 770®+SANDUVOR 3050®
20. TINUVIN 622®+TINUVIN 770®+SANDUVOR PR-31®
21. TINUVIN 622®+TINUVIN 770®+UVASIL 299 LM®
22. TINUVIN 622®+TINUVIN 770®+UVASIL 2000 LM®
23. TINUVIN 622®+TINUVIN 770®+compound of the formula (B-6-a) wherein $E_{18}$ is hydrogen
24. TINUVIN 622®+TINUVIN 770®+compound of the formula (B-6-a) wherein $E_{18}$ is methyl
25. TINUVIN 622®+TINUVIN 770®+compound of the formula (B-7) with $E_{19}$, $E_{20}$ and $E_{21}$ being a group of the formula (b-III) wherein $E_{22}$ is hydrogen.
26. TINUVIN 622®+TINUVIN 765®+TINUVIN 144®
27. TINUVIN 622®+TINUVIN 765®+TINUVIN 123®
28. TINUVIN 622®+TINUVIN 765®+compound of the formula (B-3-a) wherein $E_{12}$ is hydrogen
29. TINUVIN 622®+TINUVIN 765®+HOSTAVIN N 24®
30. TINUVIN 622®+TINUVIN 765®+DIACETAM 5®
31. TINUVIN 622®+TINUVIN 765®+ADK STAB LA 52®
32. TINUVIN 622®+TINUVIN 765®+ADK STAB LA 57®
33. TINUVIN 622®+TINUVIN 765®+ADK STAB LA 62®
34. TINUVIN 622®+TINUVIN 765®+ADK STAB LA 67®
35. TINUVIN 622®+TINUVIN 765®+GOODRITE UV 3034®
36. TINUVIN 622®+TINUVIN 765®+GOODRITE UV 3150®
37. TINUVIN 622®+TINUVIN 765®+GOODRITE UV 3159®
38. TINUVIN 622®+TINUVIN 765®+compound of the formula (B-9-a) wherein $E_{25}$ is hydrogen
39. TINUVIN 622®+TINUVIN 765®+UVINUL 4049®
40. TINUVIN 622®+TINUVIN 765®+compound of the formula (B-10-a) wherein $E_{29}$ is hydrogen
41. TINUVIN 622®+TINUVIN 765®+compound of the formula (B-1-a) wherein $E_1$ is hydrogen
42. TINUVIN 622®+TINUVIN 765®+SUMISORB TM 61®
43. TINUVIN 622®+TINUVIN 765®+SANDUVOR 3050®
44. TINUVIN 622®+TINUVIN 765®+SANDUVOR PR-31®
45. TINUVIN 622®+TINUVIN 765®+UVASIL 299 LM®
46. TINUVIN 622®+TINUVIN 765®+UVASIL 2000 LM®
47. TINUVIN 622®+TINUVIN 765®+compound of the formula (B-6-a) wherein $E_{18}$ is hydrogen
48. TINUVIN 622®+TINUVIN 765®+compound of the formula (B-6-a) wherein $E_{18}$ is methyl
49. TINUVIN 622®+TINUVIN 765®+compound of the formula (B-7) with $E_{19}$, $E_{20}$ and $E_{21}$ being a group of the formula (b-III) wherein $E_{22}$ is hydrogen.
50. TINUVIN 622®+TINUVIN 144®+TINUVIN 123®
51. TINUVIN 622®+TINUVIN 144®+compound of the formula (B-3-a) wherein $E_{12}$ is hydrogen
52. TINUVIN 622®+TINUVIN 144®+HOSTAVIN N 24®
53. TINUVIN 622®+TINUVIN 144®+DIACETAM 5®
54. TINUVIN 622®+TINUVIN 144®+ADK STAB LA 52®
55. TINUVIN 622®+TINUVIN 144®+ADK STAB LA 57®
56. TINUVIN 622®+TINUVIN 144®+ADK STAB LA 62®
57. TINUVIN 622®+TINUVIN 144®+ADK STAB LA 67®
58. TINUVIN 622®+TINUVIN 144®+GOODRITE UV 3034®
59. TINUVIN 622®+TINUVIN 144®+GOODRITE UV 3150®
60. TINUVIN 622®+TINUVIN 144®+GOODRITE UV 3159®
61. TINUVIN 622®+TINUVIN 144®+compound of the formula (B-9-a) wherein $E_{25}$ is hydrogen
62. TINUVIN 622®+TINUVIN 144®+UVINUL 4049®
63. TINUVIN 622®+TINUVIN 144®+compound of the formula (B-10-a) wherein $E_{29}$ is hydrogen
64. TINUVIN 622®+TINUVIN 144®+compound of the formula (B-1-a) wherein $E_1$ is hydrogen
65. TINUVIN 622®+TINUVIN 144®+SUMISORB TM 61®
66. TINUVIN 622®+TINUVIN 144®+SANDUVOR 3050®
67. TINUVIN 622®+TINUVIN 144®+SANDUVOR PR-31®
68. TINUVIN 622®+TINUVIN 144®+UVASIL 299 LM®
69. TINUVIN 622®+TINUVIN 144®+UVASIL 2000 LM®
70. TINUVIN 622®+TINUVIN 144®+compound of the formula (B-6-a) wherein $E_{18}$ is hydrogen
71. TINUVIN 622®+TINUVIN 144®+compound of the formula (B-6-a) wherein $E_{18}$ is methyl
72. TINUVIN 622®+TINUVIN 144®+compound of the formula (B-7) with $E_{19}$, $E_{20}$ and $E_{21}$ being a group of the formula (b-III) wherein $E_{22}$ is hydrogen.
73. TINUVIN 622®+TINUVIN 123®+compound of the formula (B-3-a) wherein $E_{12}$ is hydrogen 74. TINUVIN 622®+TINUVIN 123®+HOSTAVIN N 24®
75. TINUVIN 622®+TINUVIN 123®+DIACETAM 5®
76. TINUVIN 622®+TINUVIN 123®+ADK STAB LA 52®
77. TINUVIN 622®+TINUVIN 123®+ADK STAB LA 57®
78. TINUVIN 622®+TINUVIN 123®+ADK STAB LA 62®
79. TINUVIN 622®+TINUVIN 123®+ADK STAB LA 67®
80. TINUVIN 622®+TINUVIN 123®+GOODRITE UV 3034®
81. TINUVIN 622®+TINUVIN 123®+GOODRITE UV 3150®
82. TINUVIN 622®+TINUVIN 123®+GOODRITE UV 3159®
83. TINUVIN 622®+TINUVIN 123®+compound of the formula (B-9-a) wherein $E_{25}$ is hydrogen
84. TINUVIN 622®+TINUVIN 123®+UVINUL 4049®
85. TINUVIN 622®+TINUVIN 123®+compound of the formula (B-10-a) wherein $E_{29}$ is hydrogen
86. TINUVIN 622®+TINUVIN 123®+compound of the formula (B-1-a) wherein $E_1$ is hydrogen
87. TINUVIN 622®+TINUVIN 123®+SUMISORB TM 61®
88. TINUVIN 622®+TINUVIN 123®+SANDUVOR 3050®
89. TINUVIN 622®+TINUVIN 123®+SANDUVOR PR-31®
90. TINUVIN 622®+TINUVIN 123®+UVASIL 299 LM®
91. TINUVIN 622®+TINUVIN 123®+UVASIL 2000 LM®
92. TINUVIN 622®+TINUVIN 123®+compound of the formula (B-6-a) wherein $E_{18}$ is hydrogen
93. TINUVIN 622®+TINUVIN 123®+compound of the formula (B-6-a) wherein $E_{18}$ is methyl
94. TINUVIN 622®+TINUVIN 123®+compound of the formula (B-7) with $E_{19}$, $E_{20}$ and $E_{21}$ being a group of the formula (b-III) wherein $E_{22}$ is hydrogen.
95. TINUVIN 622®+compound of the formula (B-3-a) wherein $E_{12}$ is hydrogen+HOSTAVIN N 24®
96. TINUVIN 622®+compound of the formula (B-3-a) wherein $E_{12}$ is hydrogen+DIACETAM 5®
97. TINUVIN 622®+compound of the formula (B-3-a) wherein $E_{12}$ is hydrogen+ADK STAB LA 52®
98. TINUVIN 622®+compound of the formula (B-3-a) wherein $E_{12}$ is hydrogen+ADK STAB LA 57®
99. TINUVIN 622®+compound of the formula (B-3-a) wherein $E_{12}$ is hydrogen+ADK STAB LA 62®
100. TINUVIN 622®+compound of the formula (B-3-a) wherein $E_{12}$ is hydrogen+ADK STAB LA 67®
101. TINUVIN 622®+compound of the formula (B-3-a) wherein $E_{12}$ is hydrogen+GOODRITE UV 3034®
102. TINUVIN 622®+compound of the formula (B-3-a) wherein $E_{12}$ is hydrogen+GOODRITE UV 3150®
103. TINUVIN 622®+compound of the formula (B-3-a) wherein $E_{12}$ is hydrogen+GOODRITE UV 3159®
104. TINUVIN 622®+compound of the formula (B-3-a) wherein $E_{12}$ is hydrogen+compound of the formula (B-9-a) wherein $E_{25}$ is hydrogen
105. TINUVIN 622®+compound of the formula (B-3-a) wherein $E_{12}$ is hydrogen+UVINUL 4049®
106. TINUVIN 622®+compound of the formula (B-3-a) wherein $E_{12}$ is hydrogen+compound of the formula (B-10-a) wherein $E_{29}$ is hydrogen
107. TINUVIN 622®+compound of the formula (B-3-a) wherein $E_{12}$ is hydrogen+compound of the formula (B-1-a) wherein $E_1$ is hydrogen
108. TINUVIN 622®+compound of the formula (B-3-a) wherein $E_{12}$ is hydrogen+SUMISORB TM 61®
109. TINUVIN 622®+compound of the formula (B-3-a) wherein $E_{12}$ is hydrogen+SANDUVOR 3050®
110. TINUVIN 622®+compound of the formula (B-3-a) wherein $E_{12}$ is hydrogen+SANDUVOR PR-31®
111. TINUVIN 622®+compound of the formula (B-3-a) wherein $E_{12}$ is hydrogen+UVASIL 299 LM®
112. TINUVIN 622®+compound of the formula (B-3-a) wherein $E_{12}$ is hydrogen+UVASIL 2000 LM®
113. TINUVIN 622®+compound of the formula (B-3-a) wherein $E_{12}$ is hydrogen+compound of the formula (B-6-a) wherein $E_{18}$ is hydrogen
114. TINUVIN 622®+compound of the formula (B-3-a) wherein $E_{12}$ is hydrogen+compound of the formula (B-6-a) wherein $E_{18}$ is methyl
115. TINUVIN 622®+compound of the formula (B-3-a) wherein $E_{12}$ is hydrogen+compound of the formula (B-7) with $E_{19}$, $E_{20}$ and $E_{21}$ being a group of the formula (b-III) wherein $E_{22}$ is hydrogen.
116. TINUVIN 622®+HOSTAVIN N 24®+DIACETAM 5®
117. TINUVIN 622®+HOSTAVIN N 24®+ADK STAB LA 52®
118. TINUVIN 622®+HOSTAVIN N 24®+ADK STAB LA 57®
119. TINUVIN 622®+HOSTAVIN N 24®+ADK STAB LA 62®
120. TINUVIN 622®+HOSTAVIN N 24®+ADK STAB LA 67®
121. TINUVIN 622®+HOSTAVIN N 24®+GOODRITE UV 3034®
122. TINUVIN 622®+HOSTAVIN N 24®+GOODRITE UV 3150®
123. TINUVIN 622®+HOSTAVIN N 24®+GOODRITE UV 3159®
124. TINUVIN 622®+HOSTAVIN N 24®+compound of the formula (B-9-a) wherein $E_{25}$ is hydrogen
125. TINUVIN 622®+HOSTAVIN N 24®+UVINUL 4049®
126. TINUVIN 622®+HOSTAVIN N 24®+compound of the formula (B-10-a) wherein $E_{29}$ is hydrogen
127. TINUVIN 622®+HOSTAVIN N 24®+compound of the formula (B-1-a) wherein $E_1$ is hydrogen
128. TINUVIN 622®+HOSTAVIN N 24®+SUMISORB TM 61®
129. TINUVIN 622®+HOSTAVIN N 24®+SANDUVOR 3050®
130. TINUVIN 622®+HOSTAVIN N 24®+SANDUVOR PR-31®
131. TINUVIN 622®+HOSTAVIN N 24®+UVASIL 299 LM®
132. TINUVIN 622®+HOSTAVIN N 24®+UVASIL 2000 LM®
133. TINUVIN 622®+HOSTAVIN N 24®+compound of the formula (B-6-a) wherein $E_{18}$ is hydrogen
134. TINUVIN 622®+HOSTAVIN N 24®+compound of the formula (B-6-a) wherein $E_{18}$ is methyl
135. TINUVIN 622®+HOSTAVIN N 24®+compound of the formula (B-7) with $E_{19}$, $E_{20}$ and $E_{21}$ being a group of the formula (b-III) wherein $E_{22}$ is hydrogen.
136. TINUVIN 622®+DIACETAM 5®+ADK STAB LA 52®
137. TINUVIN 622®+DIACETAM 5®+ADK STAB LA 57®
138. TINUVIN 622®+DIACETAM 5®+ADK STAB LA 62®
139. TINUVIN 622®+DIACETAM 5®+ADK STAB LA 67®
140. TINUVIN 622®+DIACETAM 5®+GOODRITE UV 3034®
141. TINUVIN 622®+DIACETAM 5®+GOODRITE UV 3150®

142. TINUVIN 622®+DIACETAM 5®+GOODRITE UV 3159®
143. TINUVIN 622®+DIACETAM 5®+compound of the formula (B-9-a) wherein $E_{25}$ is hydrogen
144. TINUVIN 622®+DIACETAM 5®+UVINUL 4049®
145. TINUVIN 622®+DIACETAM 5®+compound of the formula (B-10-a) wherein $E_{29}$ is hydrogen
146. TINUVIN 622®+DIACETAM 5®+compound of the formula (B-1-a) wherein $E_1$ is hydrogen
147. TINUVIN 622®+DIACETAM 5®+SUMISORB TM 61®
148. TINUVIN 622®+DIACETAM 5®+SANDUVOR 3050®
149. TINUVIN 622®+DIACETAM 5®+SANDUVOR PR-31®
150. TINUVIN 622®+DIACETAM 5®+UVASIL 299 LM®
151. TINUVIN 622®+DIACETAM 5®+UVASIL 2000 LM®
152. TINUVIN 622®+DIACETAM 5®+compound of the formula (B-6-a) wherein $E_{18}$ is hydrogen
153. TINUVIN 622®+DIACETAM 5®+compound of the formula (B-6-a) wherein $E_{18}$ is methyl
154. TINUVIN 622®+DIACETAM 5®+compound of the formula (B-7) with $E_{19}$, $E_{20}$ and $E_{21}$ being a group of the formula (b-III) wherein $E_{22}$ is hydrogen.
155. TINUVIN 622®+ADK STAB LA 52®+ADK STAB LA 57®
156. TINUVIN 622®+ADK STAB LA 52®+ADK STAB LA 62®
157. TINUVIN 622®+ADK STAB LA 52®+ADK STAB LA 67®
158. TINUVIN 622®+ADK STAB LA 52®+GOODRITE UV 3034®
159. TINUVIN 622®+ADK STAB LA 52®+GOODRITE UV 3150®
160. TINUVIN 622®+ADK STAB LA 52®+GOODRITE UV 3159®
161. TINUVIN 622®+ADK STAB LA 52®+compound of the formula (B-9-a) wherein $E_{25}$ is hydrogen
162. TINUVIN 622®+ADK STAB LA 52®+UVINUL 4049®
163. TINUVIN 622®+ADK STAB LA 52®+compound of the formula (B-10-a) wherein $E_{29}$ is hydrogen
164. TINUVIN 622®+ADK STAB LA 52®+compound of the formula (B-1-a) wherein $E_1$ is hydrogen
165. TINUVIN 622®+ADK STAB LA 52®+SUMISORB TM 61®
166. TINUVIN 622®+ADK STAB LA 52®+SANDUVOR 3050®
167. TINUVIN 622®+ADK STAB LA 52®+SANDUVOR PR-31®
168. TINUVIN 622®+ADK STAB LA 52®+UVASIL 299 LM®
169. TINUVIN 622®+ADK STAB LA 52®+UVASIL 2000 LM®
170. TINUVIN 622®+ADK STAB LA 52®+compound of the formula (B-6-a) wherein $E_{18}$ is hydrogen
171. TINUVIN 622®+ADK STAB LA 52®+compound of the formula (B-6-a) wherein $E_{18}$ is methyl
172. TINUVIN 622®+ADK STAB LA 52®+compound of the formula (B-7) with $E_{19}$, $E_{20}$ and $E_{21}$ being a group of the formula (b-III) wherein $E_{22}$ is hydrogen.
173. TINUVIN 622®+ADK STAB LA 57®+ADK STAB LA 62®
174. TINUVIN 622®+ADK STAB LA 57®+ADK STAB LA 67®
175. TINUVIN 622®+ADK STAB LA 57®+GOODRITE UV 3034®
176. TINUVIN 622®+ADK STAB LA 57®+GOODRITE UV 3150®
177. TINUVIN 622®+ADK STAB LA 57®+GOODRITE UV 3159®
178. TINUVIN 622®+ADK STAB LA 57®+compound of the formula (B-9-a) wherein $E_{25}$ is hydrogen
179. TINUVIN 622®+ADK STAB LA 57®+UVINUL 4049®
180. TINUVIN 622®+ADK STAB LA 57®+compound of the formula (B-10-a) wherein $E_{29}$ is hydrogen
181. TINUVIN 622®+ADK STAB LA 57®+compound of the formula (B-1-a) wherein $E_1$ is hydrogen
182. TINUVIN 622®+ADK STAB LA 57®+SUMISORB TM 61®
183. TINUVIN 622®+ADK STAB LA 57®+SANDUVOR 3050®
184. TINUVIN 622®+ADK STAB LA 57®+SANDUVOR PR-31®
185. TINUVIN 622®+ADK STAB LA 57®+UVASIL 299 LM®
186. TINUVIN 622®+ADK STAB LA 57®+UVASIL 2000 LM®
187. TINUVIN 622®+ADK STAB LA 57®+compound of the formula (B-6-a) wherein $E_{18}$ is hydrogen
188. TINUVIN 622®+ADK STAB LA 57®+compound of the formula (B-6-a) wherein $E_{18}$ is methyl
189. TINUVIN 622®+ADK STAB LA 57®+compound of the formula (B-7) with $E_{19}$, $E_{20}$ and $E_2$, being a group of the formula (b-III) wherein $E_{22}$ is hydrogen.
190. TINUVIN 622®+ADK STAB LA 62®+ADK STAB LA 67®
191. TINUVIN 622®+ADK STAB LA 62®+GOODRITE UV 3034®
192. TINUVIN 622®+ADK STAB LA 62®+GOODRITE UV 3150®
193. TINUVIN 622®+ADK STAB LA 62®+GOODRITE UV 3159®
194. TINUVIN 622®+ADK STAB LA 62®+compound of the formula (B-9-a) wherein $E_{25}$ is hydrogen
195. TINUVIN 622®+ADK STAB LA 62®+UVINUL 4049®
196. TINUVIN 622®+ADK STAB LA 62®+compound of the formula (B-10-a) wherein $E_{29}$ is hydrogen
197. TINUVIN 622®+ADK STAB LA 62®+compound of the formula (B-1-a) wherein $E_1$ is hydrogen
198. TINUVIN 622®+ADK STAB LA 62®+SUMISORB TM 61®
199. TINUVIN 622®+ADK STAB LA 62®+SANDUVOR 3050®
200. TINUVIN 622®+ADK STAB LA 62®+SANDUVOR PR-31®
201. TINUVIN 622®+ADK STAB LA 62®+UVASIL 299 LM®
202. TINUVIN 622®+ADK STAB LA 62®+UVASIL 2000 LM®
203. TINUVIN 622®+ADK STAB LA 62®+compound of the formula (B-6-a) wherein $E_{18}$ is hydrogen
204. TINUVIN 622®+ADK STAB LA 62®+compound of the formula (B-6-a) wherein $E_{18}$ is methyl
205. TINUVIN 622®+ADK STAB LA 62®+compound of the formula (B-7) with $E_{19}$, $E_{20}$ and $E_2$, being a group of the formula (b-III) wherein $E_{22}$ is hydrogen.
206. TINUVIN 622®+ADK STAB LA 67®+GOODRITE UV 3034®

207. TINUVIN 622®+ADK STAB LA 67®+GOODRITE UV 3150®
208. TINUVIN 622®+ADK STAB LA 67®+GOODRITE UV 3159®
209. TINUVIN 622®+ADK STAB LA 67®+compound of the formula (B-9-a) wherein $E_{25}$ is hydrogen
210. TINUVIN 622®+ADK STAB LA 67®+UVINUL 4049®
211. TINUVIN 622®+ADK STAB LA 67®+compound of the formula (B-10-a) wherein $E_{29}$ is hydrogen
212. TINUVIN 622®+ADK STAB LA 67®+compound of the formula (B-1-a) wherein $E_1$ is hydrogen
213. TINUVIN 622®+ADK STAB LA 67®+SUMISORB TM 61®
214. TINUVIN 622®+ADK STAB LA 67®+SANDUVOR 3050®
215. TINUVIN 622®+ADK STAB LA 67®+SANDUVOR PR-31®
216. TINUVIN 622®+ADK STAB LA 67®+UVASIL 299 LM®
217. TINUVIN 622®+ADK STAB LA 67®+UVASIL 2000 LM®
218. TINUVIN 622®+ADK STAB LA 67®+compound of the formula (B-6-a) wherein $E_{18}$ is hydrogen
219. TINUVIN 622®+ADK STAB LA 67®+compound of the formula (B-6-a) wherein $E_{18}$ is methyl
220. TINUVIN 622®+ADK STAB LA 67®+compound of the formula (B-7) with $E_{19}$, $E_{20}$ and $E_{21}$ being a group of the formula (b-III) wherein $E_{22}$ is hydrogen.
221. TINUVIN 622®+GOODRITE UV 3034®+GOODRITE UV 3150®
222. TINUVIN 622®+GOODRITE UV 3034®+GOODRITE UV 3159®
223. TINUVIN 622®+GOODRITE UV 3034®+compound of the formula (B-9-a) wherein $E_{25}$ is hydrogen
224. TINUVIN 622®+GOODRITE UV 3034®+UVINUL 4049®
225. TINUVIN 622®+GOODRITE UV 3034®+compound of the formula (B-10-a) wherein $E_{29}$ is hydrogen
226. TINUVIN 622®+GOODRITE UV 3034®+compound of the formula (B-1-a) wherein $E_1$ is hydrogen
227. TINUVIN 622®+GOODRITE UV 3034®+SUMISORB TM 61®
228. TINUVIN 622®+GOODRITE UV 3034®+SANDUVOR 3050®
229. TINUVIN 622®+GOODRITE UV 3034®+SANDUVOR PR-31®
230. TINUVIN 622®+GOODRITE UV 3034®+UVASIL 299 LM®
231. TINUVIN 622®+GOODRITE UV 3034®+UVASIL 2000 LM®
232. TINUVIN 622®+GOODRITE UV 3034®+compound of the formula (B-6-a) wherein $E_{18}$ is hydrogen
233. TINUVIN 622®+GOODRITE UV 3034®+compound of the formula (B-6-a) wherein $E_{18}$ is methyl
234. TINUVIN 622®+GOODRITE UV 3034®+compound of the formula (B-7) with $E_{19}$, $E_{20}$ and $E_{21}$ being a group of the formula (b-III) wherein $E_{22}$ is hydrogen.
235. TINUVIN 622®+GOODRITE UV 3150®+GOODRITE UV 3159®
236. TINUVIN 622®+GOODRITE UV 3150®+compound of the formula (B-9-a) wherein $E_{25}$ is hydrogen
237. TINUVIN 622®+GOODRITE UV 3150®+UVINUL 4049®
238. TINUVIN 622®+GOODRITE UV 3150®+compound of the formula (B-10-a) wherein $E_{29}$ is hydrogen
239. TINUVIN 622®+GOODRITE UV 3150®+compound of the formula (B-1-a) wherein $E_1$ is hydrogen
240. TINUVIN 622®+GOODRITE UV 3150®+SUMISORB TM 61®
241. TINUVIN 622®+GOODRITE UV 3150®+SANDUVOR 3050®
242. TINUVIN 622®+GOODRITE UV 3150®+SANDUVOR PR-31®
243. TINUVIN 622®+GOODRITE UV 3150®+UVASIL 299 LM®
244. TINUVIN 622®+GOODRITE UV 3150®+UVASIL 2000 LM®
245. TINUVIN 622®+GOODRITE UV 3150®+compound of the formula (B-6-a) wherein $E_{18}$ is hydrogen
246. TINUVIN 622®+GOODRITE UV 3150®+compound of the formula (B-6-a) wherein $E_{18}$ is methyl
247. TINUVIN 622®+GOODRITE UV 3150®+compound of the formula (B-7) with $E_{19}$, $E_{20}$ and $E_{21}$ being a group of the formula (b-III) wherein $E_{22}$ is hydrogen.
248. TINUVIN 622®+GOODRITE UV 3159®+compound of the formula (B-9-a) wherein $E_{25}$ is hydrogen
249. TINUVIN 622®+GOODRITE UV 3159®+UVINUL 4049®
250. TINUVIN 622®+GOODRITE UV 3159®+compound of the formula (B-10-a) wherein $E_{29}$ is hydrogen
251. TINUVIN 622®+GOODRITE UV 3159®+compound of the formula (B-1-a) wherein $E_1$ is hydrogen
252. TINUVIN 622®+GOODRITE UV 3159®+SUMISORB TM 61®
253. TINUVIN 622®+GOODRITE UV 3159®+SANDUVOR 3050®
254. TINUVIN 622®+GOODRITE UV 3159®+SANDUVOR PR-31®
255. TINUVIN 622®+GOODRITE UV 3159®+UVASIL 299 LM®
256. TINUVIN 622®+GOODRITE UV 3159®+UVASIL 2000 LM®
257. TINUVIN 622®+GOODRITE UV 3159®+compound of the formula (B-6-a) wherein $E_{18}$ is hydrogen
258. TINUVIN 622®+GOODRITE UV 3159®+compound of the formula (B-6-a) wherein $E_{18}$ is methyl
259. TINUVIN 622®+GOODRITE UV 3159®+compound of the formula (B-7) with $E_{19}$, $E_{20}$ and $E_{21}$ being a group of the formula (b-III) wherein $E_{22}$ is hydrogen.
260. TINUVIN 622®+compound of the formula (B-9-a) wherein $E_{25}$ is hydrogen+UVINUL 4049®
261. TINUVIN 622®+compound of the formula (B-9-a) wherein $E_{25}$ is hydrogen+compound of the formula (B-10-a) wherein $E_{29}$ is hydrogen
262. TINUVIN 622®+compound of the formula (B-9-a) wherein $E_{25}$ is hydrogen+compound of the formula (B-1-a) wherein $E_1$ is hydrogen
263. TINUVIN 622®+compound of the formula (B-9-a) wherein $E_{26}$ is hydrogen+SUMISORB TM 61®
264. TINUVIN 622®+compound of the formula (B-9-a) wherein $E_{25}$ is hydrogen+SANDUVOR 3050®
265. TINUVIN 622®+compound of the formula (B-9-a) wherein $E_{25}$ is hydrogen+SANDUVOR PR-31®
266. TINUVIN 622®+compound of the formula (B-9-a) wherein $E_{25}$ is hydrogen+UVASIL 299 LM®
267. TINUVIN 622®+compound of the formula (B-9-a) wherein $E_{25}$ is hydrogen+UVASIL 2000 LM®
268. TINUVIN 622®+compound of the formula (B-9-a) wherein $E_{25}$ is hydrogen+compound of the formula (B-6-a) wherein $E_{18}$ is hydrogen 269. TINUVIN 622®+compound of the formula (B-9-a) wherein $E_{25}$ is hydrogen+compound of the formula (B-6-a) wherein $E_{18}$ is methyl
270. TINUVIN 622®+compound of the formula (B-9-a) wherein $E_{25}$ is hydrogen+compound of the formula (B-7) with $E_{19}$, $E_{20}$ and $E_{21}$ being a group of the formula (b-III) wherein $E_{22}$ is hydrogen.
271. TINUVIN 622®+UVINUL 4049®+compound of the formula (B-10-a) wherein $E_{29}$ is hydrogen
272. TINUVIN 622®+UVINUL 4049®+compound of the formula (B-1-a) wherein $E_1$ is hydrogen
273. TINUVIN 622®+UVINUL 4049®+SUMISORB TM 61®
274. TINUVIN 622®+UVINUL 4049®+SANDUVOR 3050®
275. TINUVIN 622®+UVINUL 4049®+SANDUVOR PR-31®
276. TINUVIN 622®+UVINUL 4049®+UVASIL 299 LM®
277. TINUVIN 622®+UVINUL 4049®+UVASIL 2000 LM®
278. TINUVIN 622®+UVINUL 4049®+compound of the formula (B-6-a) wherein $E_{18}$ is hydrogen
279. TINUVIN 622®+UVINUL 4049®+compound of the formula (B-6-a) wherein $E_{18}$ is methyl
280. TINUVIN 622®+UVINUL 4049®+compound of the formula (B-7) with $E_{19}$, $E_{20}$ and $E_{21}$ being a group of the formula (b-III) wherein $E_{22}$ is hydrogen.
281. TINUVIN 622®+compound of the formula (B-10-a) wherein $E_{29}$ is hydrogen+compound of the formula (B-1-a) wherein $E_1$ is hydrogen
282. TINUVIN 622®+compound of the formula (B-10-a) wherein $E_{29}$ is hydrogen+SUMISORB TM 61®
283. TINUVIN 622®+compound of the formula (B-10-a) wherein $E_{29}$ is hydrogen+SANDUVOR 3050®
284. TINUVIN 622®+compound of the formula (B-10-a) wherein $E_{29}$ is hydrogen+SANDUVOR PR-31®
285. TINUVIN 622®+compound of the formula (B-10-a) wherein $E_{29}$ is hydrogen+UVASIL 299 LM®
286. TINUVIN 622®+compound of the formula (B-10-a) wherein $E_{29}$ is hydrogen+UVASIL 2000 LM®
287. TINUVIN 622®+compound of the formula (B-10-a) wherein $E_{29}$ is hydrogen+compound of the formula (B-6-a) wherein $E_{18}$ is hydrogen
288. TINUVIN 622®+compound of the formula (B-10-a) wherein $E_{29}$ is hydrogen+compound of the formula (B-6-a) wherein $E_{18}$ is methyl
289. TINUVIN 622®+compound of the formula (B-10-a) wherein $E_{29}$ is hydrogen+compound of the formula (B-7) with $E_{19}$, $E_{20}$ and $E_{21}$ being a group of the formula (b-III) wherein $E_{22}$ is hydrogen.
290. TINUVIN 622®+compound of the formula (B-1-a) wherein $E_1$ is hydrogen+SUMISORB TM 61®
291. TINUVIN 622®+compound of the formula (B-1-a) wherein $E_1$ is hydrogen+SANDUVOR 3050®
292. TINUVIN 622®+compound of the formula (B-1-a) wherein $E_1$ is hydrogen+SANDUVOR PR-31®
293. TINUVIN 622®+compound of the formula (B-1-a) wherein $E_1$ is hydrogen+UVASIL 299 LM®
294. TINUVIN 622®+compound of the formula (B-1-a) wherein $E_1$ is hydrogen+UVASIL 2000 LM®
295. TINUVIN 622®+compound of the formula (B-1-a) wherein $E_1$ is hydrogen+compound of the formula (B-6-a) wherein $E_{18}$ is hydrogen
296. TINUVIN 622®+compound of the formula (B-1-a) wherein $E_1$ is hydrogen+compound of the formula (B-6-a) wherein $E_{18}$ is methyl
297. TINUVIN 622®+compound of the formula (B-1-a) wherein $E_1$ is hydrogen+compound of the formula (B-7) with $E_{19}$, $E_{20}$ and $E_{21}$ being a group of the formula (b-III) wherein $E_{22}$ is hydrogen.
298. TINUVIN 622®+SUMISORB TM 61®+SANDUVOR 3050®
299. TINUVIN 622®+SUMISORB TM 61®+SANDUVOR PR-31®
300. TINUVIN 622®+SUMISORB TM 61®+UVASIL 299 LM®
301. TINUVIN 622®+SUMISORB TM 61®+UVASIL 2000 LM®
302. TINUVIN 622®+SUMISORB TM 61®+compound of the formula (B-6-a) wherein $E_{18}$ is hydrogen
303. TINUVIN 622®+SUMISORB TM 61®+compound of the formula (B-6-a) wherein $E_{18}$ is methyl
304. TINUVIN 622®+SUMISORB TM 61®+compound of the formula (B-7) with $E_{19}$, $E_{20}$ and $E_{21}$ being a group of the formula (b-III) wherein $E_{22}$ is hydrogen.
305. TINUVIN 622®+SANDUVOR 3050®+SANDUVOR PR-31®
306. TINUVIN 622®+SANDUVOR 3050®+UVASIL 299 LM®
307. TINUVIN 622®+SANDUVOR 3050®+UVASIL 2000 LM®
308. TINUVIN 622®+SANDUVOR 3050®+compound of the formula (B-6-a) wherein $E_{18}$ is hydrogen
309. TINUVIN 622®+SANDUVOR 3050®+compound of the formula (B-6-a) wherein $E_{13}$ is methyl
310. TINUVIN 622®+SANDUVOR 3050®+compound of the formula (B-7) with $E_{19}$, $E_{20}$ and $E_{21}$ being a group of the formula (b-III) wherein $E_{22}$ is hydrogen.
311. TINUVIN 622®+SANDUVOR PR-31®+UVASIL 299 LM®
312. TINUVIN 622®+SANDUVOR PR-31®+UVASIL 2000 LM®
313. TINUVIN 622®+SANDUVOR PR-31®+compound of the formula (B-6-a) wherein $E_{18}$ is hydrogen
314. TINUVIN 622®+SANDUVOR PR-31®+compound of the formula (B-6-a) wherein $E_{18}$ is methyl
315. TINUVIN 622®+SANDUVOR PR-31®+compound of the formula (B-7) with $E_{19}$, $E_{20}$ and $E_2$, being a group of the formula (b-III) wherein $E_{22}$ is hydrogen.
316. TINUVIN 622®+UVASIL 299 LM®+compound of the formula (B-6-a) wherein $E_{18}$ is hydrogen
317. TINUVIN 622®+UVASIL 299 LM®+compound of the formula (B-6-a) wherein $E_{18}$ is methyl
318. TINUVIN 622®+UVASIL 299 LM®+compound of the formula (B-7) with $E_{19}$, $E_{20}$ and $E_{21}$ being a group of the formula (b-III) wherein $E_{22}$ is hydrogen.
319. TINUVIN 622®+UVASIL 2000 LM®+compound of the formula (B-6-a) wherein $E_{18}$ is hydrogen
320. TINUVIN 622®+UVASIL 2000 LM®+compound of the formula (B-6-a) wherein $E_{18}$ is methyl
321. TINUVIN 622®+UVASIL 2000 LM®+compound of the formula (B-7) with $E_{19}$, $E_{20}$ and $E_{21}$ being a group of the formula (b-III) wherein $E_{22}$ is hydrogen.
322. TINUVIN 622®+compound of the formula (B-6-a) wherein $E_{18}$ is hydrogen+compound of the formula (B-6-a) wherein $E_8$ is methyl
323. TINUVIN 622®+compound of the formula (B-6-a) wherein $E_{18}$ is hydrogen+compound of the formula (B-7) with $E_{19}$, $E_{20}$ and $E_2$, being a group of the formula (b-III) wherein $E_{22}$ is hydrogen.

324. TINUVIN 622®+compound of the formula (B-6-a) wherein $E_{18}$ is methyl+compound of the formula (B-7) with $E_{19}$, $E_{20}$ and $E_{21}$ being a group of the formula (b-III) wherein $E_{22}$ is hydrogen.

Further examples of stabilizer mixtures are those wherein in the above combinations 1 to 324 the commercial product TINUVIN 622® is replaced by a compound of the formula (A-2-a) and/or (A-2-b)

(A-2-a)

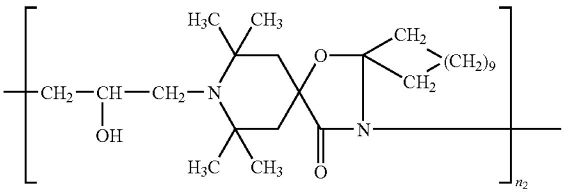

(A-2-b)

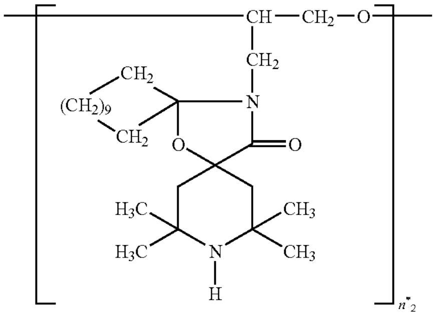

wherein $n_2$ and $n_2$* are a number from 2 to 20.

Additional examples of stabilizer mixtures are those wherein in the above combinations 1 to 324 the commercial product TINUVIN 622® is replaced by a compound of the formula (A-4-a)

(A-4-a)

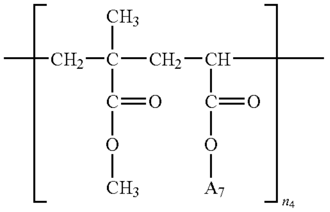

wherein $n_4$ is a number from 2 to 20, and at least 50% of the radicals $A_7$ are a group of the formula

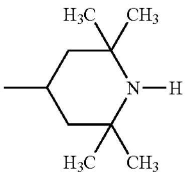

and the remaining radicals $A_7$ are ethyl.

Combinations of particular interest are numbers 1, 4, 7, 8, 12, 13 and 15 to 24, and the corresponding combinations wherein TINUVIN 622® is replaced by a compound of the formula (A-2-a) and/or (A-2-b).

Further combinations of particular interest are numbers 3, 4, 8, 17 and 31.

The commercial product TINUVIN 622® corresponds to the compound of the formula (A-1-a).

The commercial product TINUVIN 770® corresponds to the compound of the formula (B-1-b) wherein $E_1$ is hydrogen.

The commercial product TINUVIN 765® corresponds to the compound of the formula (B-1-b) wherein $E_1$ is methyl.

The commercial product TINUVIN 123® corresponds to the compound of the formula (B-1-b) wherein $E_1$ is octyloxy.

The commercial product TINUVIN 144® corresponds to the compound of the formula (B-1-c) wherein $E_1$ is methyl.

The commercial product ADK STAB LA 57® corresponds to the compound of the formula (B-1-d) wherein $E_1$ is hydrogen.

The commercial product ADK STAB LA 52® corresponds to the compound of the formula (B-1-d) wherein $E_1$ is methyl.

The commercial product ADK STAB LA 67® corresponds to the compound of the formula (B-2-a) wherein $E_8$ is hydrogen.

The commercial product ADK STAB LA 62® corresponds to the compound of the formula (B-2-a) wherein $E_1$ is methyl.

The commercial product HOSTAVIN N 24® corresponds to the compound of the formula (B-3-b) wherein $E_{12}$ is hydrogen.

The commercial product SANDUVOR 3050® corresponds to the compound of the formula (B-3-b-1) shown below, wherein $E_{12}$ is hydrogen.

The commercial product DIACETAM 5® corresponds to the compound of the formula (B-4-a) wherein $E_{13}$ is hydrogen.

The commercial product SUMISORB TM 61 corresponds to the compound of the formula (B-4-b) wherein $E_{13}$ is hydrogen.

The commercial product UVINUL 4049® corresponds to the compound of the formula (B-5) wherein $E_{16}$ is hydrogen.

The commercial product SANDUVOR PR 31® corresponds to the compound of the formula (B-8-a) wherein $E_{23}$ is methyl.

The commercial product GOODRITE 3034® corresponds to the compound of the formula (B-9-b) wherein $E_{25}$ is hydrogen.

The commercial product GOODRITE 3150® corresponds to the compound of the formula (B-9-c) wherein $E_{25}$ is hydrogen.

The commercial product GOODRITE 3159® corresponds to the compound of the formula (B-9-c) wherein $E_{25}$ is methyl.

The commercial product UVASIL 299 LM® or UVASIL 2000 LM® contains as active ingredient the compound of the formula (B-11-a) wherein $R_{16}$ is hydrogen.

The compound of the formula (B-3-b-1) has the following structure:

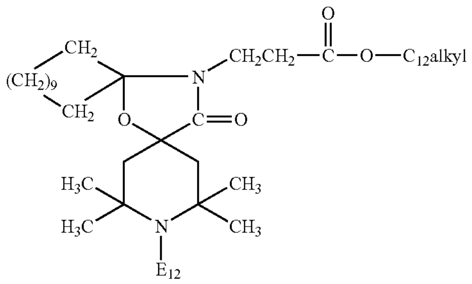

The stabilizer mixture according to this invention is suitable for stabilizing organic materials against degradation induced by light, heat or oxidation. Examples of such organic materials are the following:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MOPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethyllene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates;

polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethyllene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14, Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, isocyanates, isocyanurates, polyisocyanates or epoxy resins.

26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

30. Aqueous emulsions of natural or synthetic rubber, e.g. natural latex or latices of carboxylated styrene/butadiene copolymers.

This invention therefore additionally relates to a composition comprising an organic material subject to degradation induced by light, heat or oxidation and the stabilizer mixture described herein above.

A further embodiment of the present invention is a method for stabilizing an organic material against degradation induced by light, heat or oxidation, which comprises incorporating into the organic material the stabilizer mixture described herein above.

The organic material is preferably a synthetic polymer, in particular from one of the above groups. Polyolefins are preferred and polyethylene, polypropylene, a polyethylene copolymer and a polypropylene copolymer are particularly preferred.

The compounds of components (A) and (B) may be added to the organic material to be stabilized either individually or mixed with one another.

Each of the compounds of components (A) and (B) may be present in the organic material in an amount of preferably 0.005 to 5%, in particular 0.01 to 1% or 0.05 to 1%, relative to the weight of the organic material.

The weight ratio of the components (A):(B) is preferably 10:1 to 1:100, in particular 10:1 to 1:10 or 5:1 to 1:5. Further examples for the weight ratio are also 1:1 to 1:10, for example 1:2 to 1:5.

The weight ratio of the two components forming component (B) is for example 1:10 to 10:1 or 1:5 to 5:1, preferably 1:2 to 2:1, in particular 1:1.

The above components can be incorporated into the organic material to be stabilized by known methods, for example before or during shaping or by applying the dissolved or dispersed compounds to the organic material, if necessary with subsequent evaporation of the solvent. The components can be added to the organic material in the form of a powder, granules or a masterbatch, which contains these components in, for example, a concentration of from 2.5 to 25% by weight.

If desired, the compounds of components (A) and (B) can be blended with each other before incorporation in the organic material. They can be added to a polymer before or during the polymerization or before the crosslinking.

The materials stabilized according to this invention can be used in a wide variety of forms, for example as films, fibres, tapes, moulding compositions, profiles or as binders for paints, adhesives or putties.

The stabilized material may additionally also contain various conventional additives, for example:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methyl phenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-(1'-methylheptadec-1'-yl) phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl) adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis (6-tert-butyl-2-methylphenol), 4,4'-thiobis(3,6-di-sec-amylphenol), 4,4'-bis(2,6-dimethyl-4-hydroxyphenyl) disulfide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra (5-tert-butyl-4-hydroxy-2-methylphenyl)pentane.

1.7. O-, N- and S-benzyl compounds, for example 3, 5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, didodecylmercaptoethyl-2,2-bis(3,5-di-tert-butyl-4-hydroxybenzyl)malonate, bis[4-(1,1,3,3-tetramethylbutyl) phenyl]-2,2-bis(3,5-di-tert-butyl-4-hydroxybenzyl) malonate.

1.9. Aromatic hydroxybenzyl compounds, for example 1,3, 5-tris(3,5-di-tert-butyl-4-hydroxybenzyl)-2,4,6-trimethylbenzene, 1,4-bis(3,5-di-tert-butyl-4-hydroxybenzyl)-2,3,5, 6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4, 6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters of 3-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 19-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of 1-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminodiphenylmethane, 4,4'-diaminodiphenylmethane, N,N, N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

$$[R-CH_2CH_2-COO-CH_2CH_2]_2 \text{—},$$

where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-1-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Oxamides, for example 4, 4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:

Tris(2,4-di-tert-butylphenyl) phosphite (Irgafos® 168, Ciba-Geigy), tris(nonylphenyl) phosphite, (A)

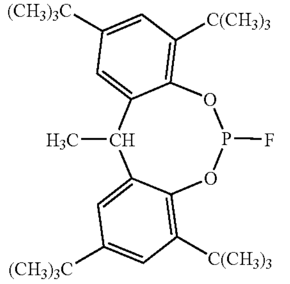

(B)

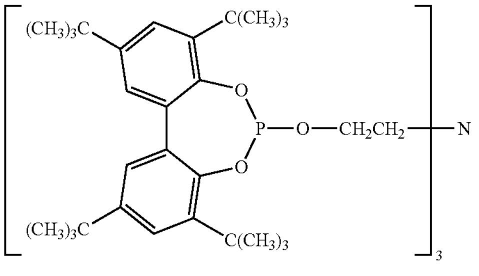

(C)

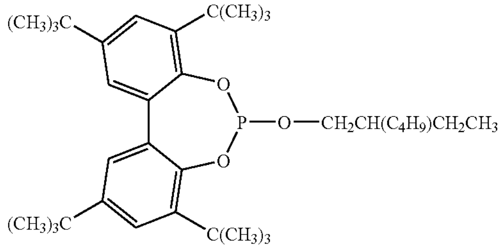

-continued (D)

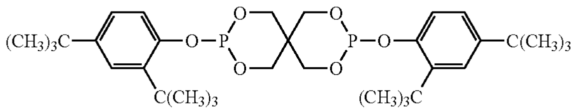

(E)

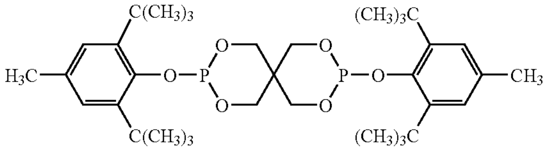

(F)

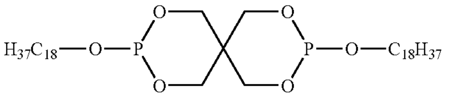

(G)

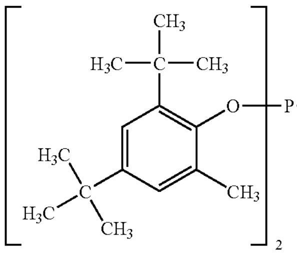

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of p-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers, pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839 or EP-A-0591102 or 3-[4-(2-acetoxyethoxy)phenyl]-5,7-di-tert-butyl benzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the total amount of components (A) and (B) to the total amount of the conventional additives can be, for example, 100:1 to 1:100 or 10:1 to 1:10.

The examples below illustrate the invention in greater detail. All percentages and parts are by weight, unless stated otherwise.

Light Stabilizers Used in the Following Examples 1 and 2:

TINUVIN 622®

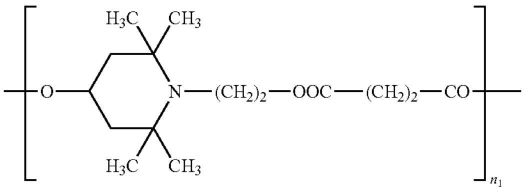

Mixture (A-2):
Mixture of the compounds (A-2-a) and (A-2-b) in a weight ratio of 4:1
(A-2-a)
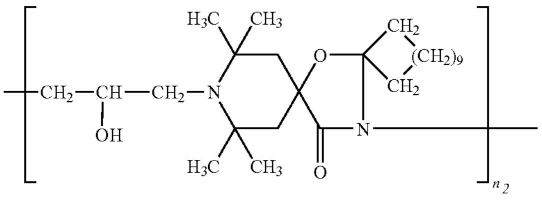
(A-2-b)
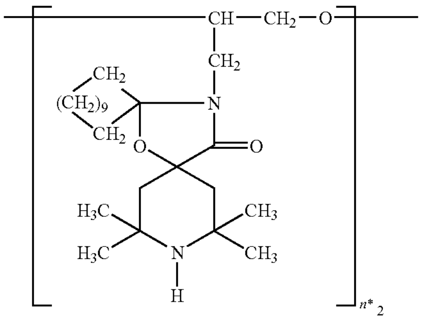
Compound (B-1-a-1):
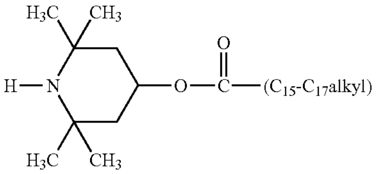
TINUVIN 770®:
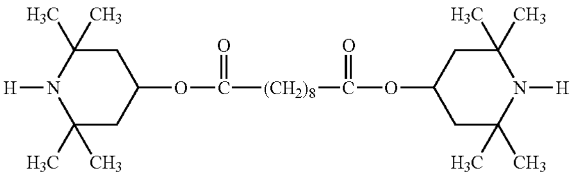
TINUVIN 765®:
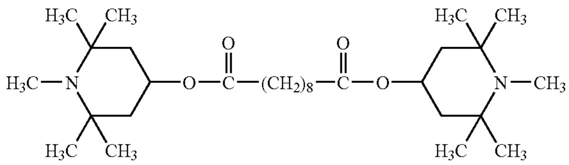
TINUVIN 123®:
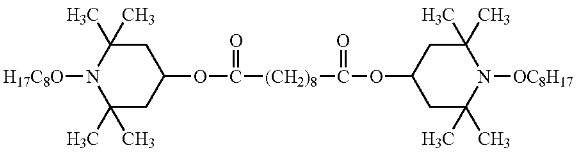
TINUVIN 144®:
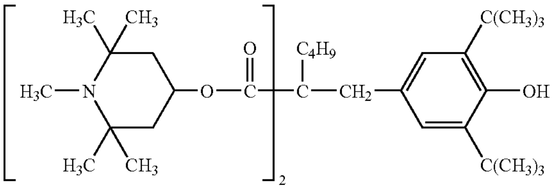
ADK STAB LA 52 (RIM):
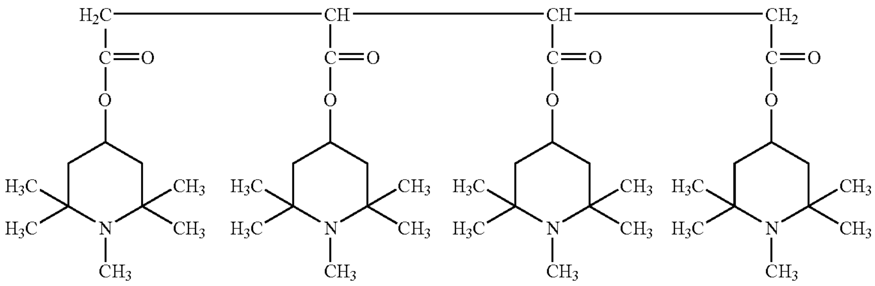

ADK STAB LA 57®:
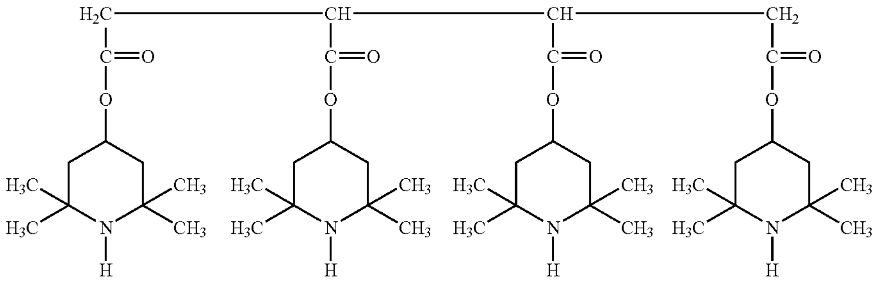
ADK STAB LA 62®:
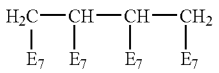
in which two of the radicals $E_7$ are —COO—$C_{13}H_{27}$ and two of the radicals $E_7$ are
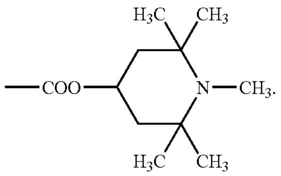
ADK STAB LA 67®:
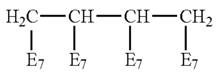
in which two of the radicals $E_7$ are —COO—$C_{13}H_{27}$ and two of the radicals $E_7$ are
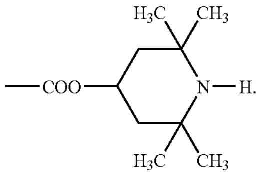
HOSTAVIN N 20®:
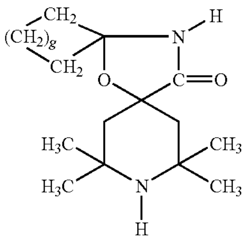
SANDUVOR 3050®:
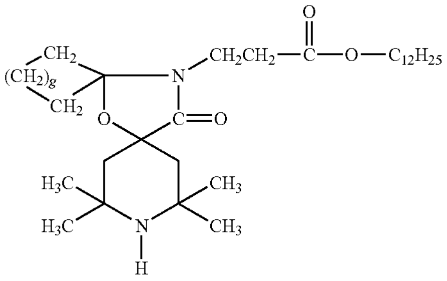
HOSTAVIN N 24®:
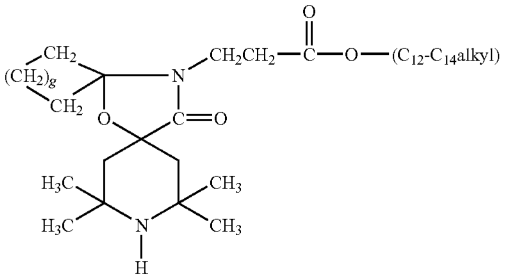

UVINUL 4049H®.
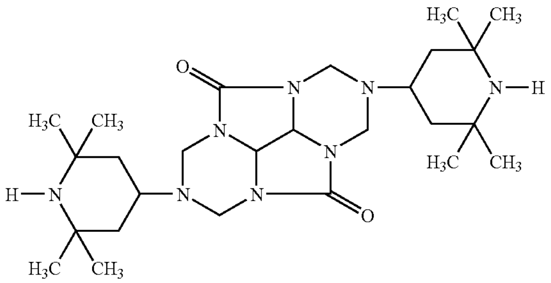
Compound (B-6-a-1):
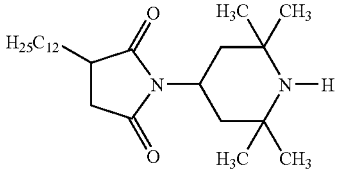
Compound (B-6-a-2):
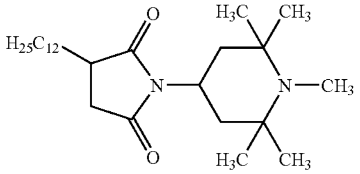
SANDUVOR PR 31®:
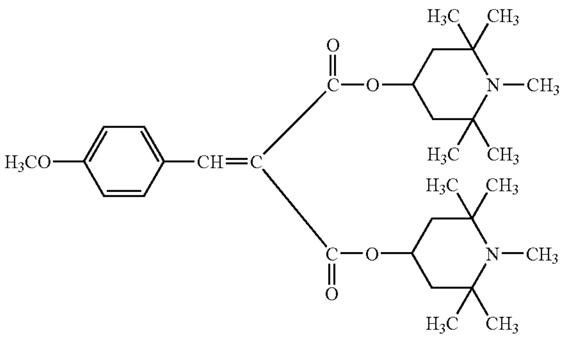
GOODRITE UV 3034®:
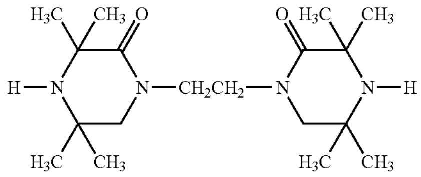
GOODRITE UV 3150®:
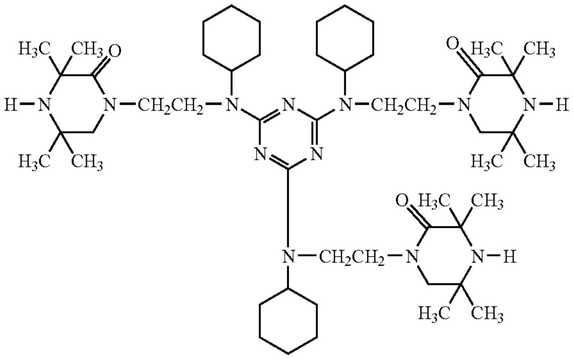
Compound (B-10-a-1):
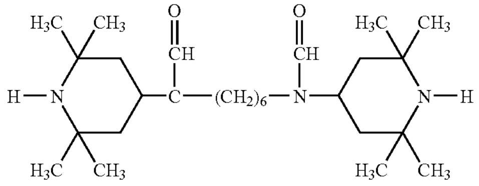
Compound (B-7-1):
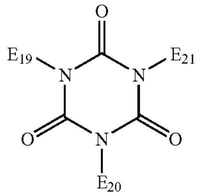
in which $E_{19}$, $E_{20}$ and $E_{21}$ are the group
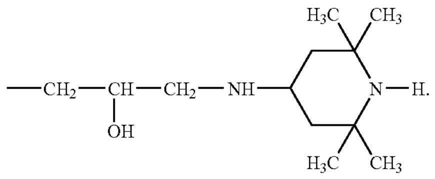

EXAMPLE 1

Light Stabilization of Polypropylene Homopolymer Films 100 parts of unstabilized polypropylene powder (melt flow index: 2.4 g/10 minutes at 230° C. and 2160 g) are homogenized at 200° C. for 10 minutes in a Brabender plastograph with 0.05 parts of pentaerythrityl-tetrakis{3-(3,5-di-tert-butyl-4-hydroxyphenyl)propionate}, 0.05 parts of tris{2,4-di-tert-butylphenyl}phosphite, 0.1 parts of Ca stearate, 0.25 parts of titanium dioxide (anatase) and the stabilizer system indicated Table 1. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without waterspraying).

Periodically, these samples are removed from the exposure apparatus and their carbonyl content is measured with an infrared spectrophotometer.

The exposure time ($T_{0.1}$) corresponding to the formation of a carbonyl absorbance of 0.1 is a measure for the efficiency of the light stabilizer system. The values obtained are summarized in Table 1. High $T_{0.1}$ values are desired.

TABLE 1

| Light stabilizer system | $T_{0.1}$ in hours The amount of the light stabilizers used is 0.075% each*). | $T_{0.1}$ in hours Light stabilizer system in combination with TINUVIN 622 (RTM) The amount of the light stabilizers used is 0.05% each*). |
|---|---|---|
| Without | 185 | — |
| TINUVIN 770 (RTM) + TINUVIN 765 (RTM) | 1780 | 3095 |
| TINUVIN 770 (RTM) + TINUVIN 144 (RTM) | 1990 | 2815 |
| TINUVIN 770 (RTM) + TINUVIN 123 (RTM) | 1780 | 2650 |
| TINUVIN 770 (RTM) + HOSTAVIN N 20 (RTM) | 2760 | 3205 |
| TINUVIN 770 (RTM) + ADK STAB LA 57 (RTM) | 2245 | 3045 |
| TINUVIN 770 (RTM) + GOODRITE UV 3034 (RTM) | 2440 | 3570 |
| TINUVIN 770 (RTM) + GOODRITE UV 3150 (RTM) | 2715 | 3230 |
| TINUVIN 770 (RTM) + Compound (B-6-a-1) | 1930 | 3095 |
| TINUVIN 770 (RTM) + Compound (B-6-a-2) | 2000 | 3400 |
| TINUVIN 770 (RTM) + Compound (B-10-a-1) | 3510 | 3940 |
| TINUVIN 770 (RTM) + Compound (B-1-a-1) | 1715 | 3520 |
| TINUVIN 770 (RTM) + SANDUVOR 3050 (RTM) | 1630 | 3040 |
| TINUVIN 770 (RTM) + SANDUVOR PR-31 (RTM) | 1885 | 2730 |
| HOSTAVIN N 20 (RTM) + ADK STAB LA 57 (RTM) | 2485 | 2765 |
| HOSTAVIN N 20 (RTM) + Compound (B-6-a-1) | 2625 | 3010 |
| HOSTAVIN N 20 (RTM) + UVINUL 4049 H (RTM) | 2655 | 3245 |
| HOSTAVIN N 20 (RTM) + Compound (B-1-a-1) | 2510 | 3055 |
| HOSTAVIN N 20 (RTM) + SANDUVOR PR-31 (RTM) | 2120 | 3140 |
| ADK STAB LA 57 (RTM) + TINUVIN 765 (RTM) | 2290 | 2705 |
| ADK STAB LA 57 (RTM) + GOODRITE UV 3150 (RTM) | 2305 | 2930 |
| ADK STAB LA 57 (RTM) + Compound (B-6-a-2) | 2255 | 2745 |
| ADK STAB LA 57 (RTM) + UVINUL 4049 H (RTM) | 2400 | 2735 |
| ADK STAB LA 57 (RTM) + SANDUVOR PR-31 (RTM) | 1670 | 2655 |
| GOODRITE UV 3150 (RTM) + Compound (B-6-a-1) | 2390 | 3040 |
| GOODRITE UV 3150 (RTM) + Compound (B-6-a-2) | 2155 | 2670 |
| GOODRITE UV 3150 (RTM) + SANDUVOR PR-31 (RTM) | 2075 | 2840 |
| Compound (B-6-a-1) + TINUVIN 765 (RTM) | 2230 | 3010 |
| Compound (B-6-a-1) + Compound (B-6-a-2) | 2235 | 2980 |
| Compound (B-6-a-1) + UVINUL 4049 H (RTM) | 2465 | 3235 |
| Compound (B-6-a-1) + Compound (B-1-a-1) | 2225 | 2775 |
| Compound (B-10-a-1) + UVINUL 4049 H (RTM) | 3430 | 4055 |
| Compound (B-10-a-1) + SANDUVOR PR-31 (RTM) | 2710 | 3255 |
| Compound (B-1-a-1) + TINUVIN 765 (RTM) | 2365 | 3060 |
| Compound (B-1-a-1) + UVINUL 4049 H (RTM) | 2475 | 3205 |
| Compound (B-1-a-1) + SANDUVOR PR-31 (RTM) | 1845 | 2550 |
| Compound (B-1-a-1) + Compound (B-6-a-2) | 2240 | 2650 |

*)The overall concentration of the light stabilizers is 0.15%.

EXAMPLE 2

Light Stabilization of Polypropylene Homopolymer Films 100 parts of unstabilized polypropylene powder (melt flow index: 3.8 g/10 minutes at 230° C. and 2160 g) are homogenized at 200° C. for 10 minutes in a Brabender plastograph with 0.05 parts of pentaerythrityl {tetrakis-3-(3,5-di-tert-butyl-4-hydroxyphenyl)propionate}, 0.05 parts of tris{2,4-di-tert-butylphenyl)phosphite}, 0.1 parts of Ca stearate, 0.25 parts of titanium dioxide (anatase) and the stabilizer system indicated in Tables 2A to 2H. The material thus obtained is compression molded in a laboratory press between two aluminum foils for 6 minutes at 260° C. to a 0.5 mm thick film which is cooled immediately to room temperature in a water-cooled press. Samples of 60 mm×25 mm are cut out of these 0.5 mm films and are exposed in a WEATHER-OMETER Ci 65 (black panel temperature 63±2° C., without waterspraying).

Periodically, these samples are removed from the exposure apparatus and their carbonyl content is measured with an infrared spectrophotometer.

The exposure time ($T_{0.1}$) corresponding to the formation of a carbonyl absorbance of 0.1 is a measure for the efficiency of the light stabilizer system. The values obtained are summarized in the following tables. High $T_{0.1}$ values are desired.

TABLE 2A

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.05% each and the amount of TINUVIN 622 (RTM) is 0.10%*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). | $T_{0.1}$ in hours Light stabilizer system in combination with TINUVIN 622 (RTM) The amount of the stabilizers of the light stabilizer system is 0.09% each and the amount of TINUVIN 622 (RTM) is 0.02%*).* |
|---|---|---|---|---|
| Without | 300 | | | |
| TINUVIN 770 (RTM) + TINUVIN 144 (RTM) | 4635 | 7530 | 7585 | 6235 |
| TINUVIN 770 (RTM) + TINUVIN 123 (RTM) | 4935 | 7940 | 7170 | 7130 |
| TINUVIN 770 (RTM) + HOSTAVIN N 24 (RTM) | 5105 | 7455 | 7030 | 6890 |
| TINUVIN 770 (RTM) + ADK STAB LA 52 (RTM) | 6710 | 6945 | 7865 | 8010 |
| TINUVIN 770 (RTM) + ADK STAB LA 57 (RTM) | 5450 | 7225 | 7225 | 7280 |
| TINUVIN 770 (RTM) + ADK STAB LA 67 (RTM) | 5915 | 6700 | 7190 | 7025 |
| TINUVIN 770 (RTM) + GOODRITE UV 3034 (RTM) | 6925 | >8340 | >8340 | 7360 |
| TINUVIN 770 (RTM) + GOODRITE UV 3150 (RTM) | 6325 | 7965 | 7625 | 7025 |
| TINUVIN 770 (RTM) + Compound (B-1-a-1) | 6040 | 7400 | 7540 | 7025 |
| TINUVIN 770 (RTM) + SANDUVOR 3050 (RTM) | 5070 | 7005 | 6990 | 5735 |
| TINUVIN 770 (RTM) + SANDUVOR PR-31 (RTM) | 5745 | 7470 | 6765 | 6705 |

*)The overall concentration of the light stabilizers is 0.20%.

TABLE 2B

| Light stabilizer system | $T_{0.1}$ in hours The amount of the light stabilizers used is 0.1% each*). | $T_{0.1}$ in hours Light stabilizer system in combination with Mixture (A-2) The amount of the stabilizers of the light stabilizer system is 0.075% each and the amount of Mixture (A-2) is 0.05%*). |
|---|---|---|
| Without | 300 | — |
| TINUVIN 770 (RTM) + TINUVIN 144 (RTM) | 4635 | 6025 |
| TINUVIN 770 (RTM) + TINUVIN 123 (RTM) | 4935 | 6080 |
| TINUVIN 770 (RTM) + HOSTAVIN N 24 (RTM) | 5105 | 6005 |
| TINUVIN 770 (RTM) + ADK STAB LA 57 (RTM) | 5450 | 6800 |
| TINUVIN 770 (RTM) + GOODRITE UV 3034 (RTM) | 6925 | 7735 |
| TINUVIN 770 (RTM) + Compound (B-6-a-2) | 6530 | 7335 |

TABLE 2B-continued

| Light stabilizer system | $T_{0.1}$ in hours The amount of the light stabilizers used is 0.1% each*). | $T_{0.1}$ in hours Light stabilizer system in combination with Mixture (A-2) The amount of the stabilizers of the light stabilizer system is 0.075% each and the amount of Mixture (A-2) is 0.05%*). |
|---|---|---|
| TINUVIN 770 (RTM) + Compound (B-1-a-1) | 6040 | 6905 |
| TINUVIN 770 (RTM) + SANDUVOR 3050 (RTM) | 5070 | >6495 |

*)The overall concentration of the light stabilizers is 0.20%.

TABLE 2C

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 315 | — |
| TINUVIN 770 (RTM) + TINUVIN 765 (RTM) | 4815 | >7260 |
| TINUVIN 770 (RTM) + TINUVIN 144 (RTM) | 5695 | 7145 |
| TINUVIN 770 (RTM) + TINUVIN 123 (RTM) | 4670 | 7080 |
| TINUVIN 770 (RTM) + HOSTAVIN N 24 (RTM) | 5390 | 6710 |
| TINUVIN 770 (RTM) + ADK STAB LA 52 (RTM) | 6655 | >7260 |
| TINUVIN 770 (RTM) + ADK STAB LA 62 (RTM) | 5040 | 6760 |
| TINUVIN 770 (RTM) + ADK STAB LA 67 (RTM) | 5010 | 6205 |
| TINUVIN 770 (RTM) + Compound (B-10-a-1) | 5825 | >7260 |
| TINUVIN 770 (RTM) + Compound (B-1-a-1) | 6125 | 7215 |
| TINUVIN 770 (RTM) + SANDUVOR 3050 (RTM) | 5690 | >7260 |
| TINUVIN 770 (RTM) + SANDUVOR PR-31 (RTM) | 5100 | 6475 |

*)The overall concentration of the light stabilizers is 0.20%.

TABLE 2D

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 315 | — |
| TINUVIN 765 (RTM) + TINUVIN 144 (RTM) | 4930 | 7180 |
| TINUVIN 765 (RTM) + TINUVIN 123 (RTM) | 4640 | >7260 |
| TINUVIN 765 (RTM) + HOSTAVIN N 20 (RTM) | 6580 | >7260 |
| TINUVIN 765 (RTM) + HOSTAVIN N 24 (RTM) | 5325 | 7040 |
| TINUVIN 765 (RTM) + ADK STAB LA 52 (RTM) | 5605 | >7260 |
| TINUVIN 765 (RTM) + ADK STAB LA 57 (RTM) | 5360 | 6905 |
| TINUVIN 765 (RTM) + ADK STAB LA 62 (RTM) | 4620 | >7260 |

TABLE 2D-continued

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| TINUVIN 765 (RTM) + ADK STAB LA 67 (RTM) | 4840 | 6625 |
| TINUVIN 765 (RTM) + GOODRITE UV 3034 (RTM) | 6550 | >7260 |
| TINUVIN 765 (RTM) + GOODRITE UV 3150 (RTM) | 5715 | >7260 |
| TINUVIN 765 (RTM) + Compound (B-6-a-1) | 5105 | >7260 |
| TINUVIN 765 (RTM) + Compound (B-1-a-1) | 6145 | >7260 |
| TINUVIN 765 (RTM) + SANDUVOR 3050 (RTM) | 5425 | >7260 |
| TINUVIN 765 (RTM) + SANDUVOR PR-31 (RTM) | 4920 | 6675 |

*)The overall concentration of the light stabilizers is 0.20%.

TABLE 2E

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 330 | |
| TINUVIN 144 (RTM) + TINUVIN 123 (RTM) | 3185 | 5765 |
| TINUVIN 144 (RTM) + HOSTAVIN N 20 (RTM) | 4295 | 6150 |
| TINUVIN 144 (RTM) + HOSTAVIN N 24 (RTM) | 3725 | 5720 |
| TINUVIN 144 (RTM) + ADK STAB LA 52 (RTM) | 4195 | 5635 |
| TINUVIN 144 (RTM) + ADK STAB LA 57 (RTM) | 4870 | 6350 |
| TINUVIN 144 (RTM) + ADK STAB LA 62 (RTM) | 2815 | 5695 |
| TINUVIN 144 (RTM) + ADK STAB LA 67 (RTM) | 3910 | 4940 |
| TINUVIN 144 (RTM) + GOODRITE UV 3034 (RTM) | 4185 | 6115 |
| TINUVIN 144 (RTM) + GOODRITE UV 3150 (RTM) | 4290 | 5725 |
| TINUVIN 144 (RTM) + Compound (B-6-a-1) | 5515 | 6565 |
| TINUVIN 144 (RTM) + Compound (B-6-a-2) | 5100 | 6810 |
| TINUVIN 144 (RTM) + Compound (B-10-a-1) | 5380 | 6585 |
| TINUVIN 144 (RTM) + Compound (B-1-a-1) | 5470 | 6305 |
| TINUVIN 144 (RTM) + SANDUVOR 3050 (RTM) | 4030 | 5200 |

TABLE 2E-continued

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| TINUVIN 144 (RTM) + SANDUVOR PR-31 (RTM) | 3105 | 5890 |

*)The overall concentration of the light stabilizers is 0.20%.

TABLE 2F

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 330 | |
| TINUVIN 123 (RTM) + HOSTAVIN N 20 (RTM) | 4455 | 5715 |
| TINUVIN 123 (RTM) + HOSTAVIN N 24 (RTM) | 3490 | 5265 |
| TINUVIN 123 (RTM) + ADK STAB LA 52 (RTM) | 4620 | 5610 |
| TINUVIN 123 (RTM) + ADK STAB LA 57 (RTM) | 4275 | 5670 |
| TINUVIN 123 (RTM) + ADK STAB LA 62 (RTM) | 3380 | 5185 |
| TINUVIN 123 (RTM) + ADK STAB LA 67 (RTM) | 3470 | 5355 |
| TINUVIN 123 (RTM) + GOODRITE UV 3034 (RTM) | 4520 | >6280 |
| TINUVIN 123 (RTM) + GOODRITE UV 3150 (RTM) | 4260 | 5635 |
| TINUVIN 123 (RTM) + Compound (B-6-a-1) | 4760 | 6145 |
| TINUVIN 123 (RTM) + Compound (B-6-a-2) | 5115 | 6365 |
| TINUVIN 123 (RTM) + Compound (B-10-a-1) | 5785 | 6700 |
| TINUVIN 123 (RTM) + Compound (B-1-a-1) | 4345 | 6115 |
| TINUVIN 123 (RTM) + SANDUVOR 3050 (RTM) | 3650 | 5040 |
| TINUVIN 123 (RTM) + SANDUVOR PR-31 (RTM) | 3655 | 5390 |
| TINUVIN 123 (RTM) + Compound (B-7-1) | 4305 | 5205 |

*)The overall concentration of the light stabilizers is 0.20%.

TABLE 2G

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 325 | |
| HOSTAVIN N 20 (RTM) + HOSTAVIN N 24 (RTM) | 3695 | 4565 |
| HOSTAVIN N 20 (RTM) + ADK STAB LA 52 (RTM) | 4375 | 5525 |
| HOSTAVIN N 20 (RTM) + ADK STAB LA 57 (RTM) | 4485 | 5535 |
| HOSTAVIN N 20 (RTM) + ADK STAB LA 62 (RTM) | 3810 | 5315 |

TABLE 2G-continued

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| HOSTAVIN N 20 (RTM) + ADK STAB LA 67 (RTM) | 3655 | 5045 |
| HOSTAVIN N 20 (RTM) + GOODRITE UV 3034 (RTM) | 5005 | 5610 |
| HOSTAVIN N 20 (RTM) + GOODRITE UV 3150 (RTM) | 3950 | 5050 |
| HOSTAVIN N 20 (RTM) + Compound (B-6-a-1) | 5025 | >5890 |
| HOSTAVIN N 20 (RTM) + Compound (B-6-a-2) | 5465 | >5890 |
| HOSTAVIN N 20 (RTM) + Compound (B-10-a-1) | 5405 | >5890 |
| HOSTAVIN N 20 (RTM) + Compound (B-1-a-1) | 5410 | >5890 |
| HOSTAVIN N 20 (RTM) + SANDUVOR 3050 (RTM) | 3985 | 5090 |
| HOSTAVIN N 20 (RTM) + SANDUVOR PR-31 (RTM) | 4085 | 5255 |
| HOSTAVIN N 20 (RTM) + Compound (B-7-1) | 4200 | 5220 |

*)The overall concentration of the light stabilizers is 0.20%.

TABLE 2H

| Light stabilizer system | $T_{0.1}$ in hours The amount of the light stabilizers used is 0.1% each*). | $T_{0.1}$ in hours Light stabilizer system in combination with TINUVIN 622 (RTM) The amount of the stabilizers of the light stabilizer system is 0.075% each and the amount of TINUVIN 622 (RTM) is 0.05%*). |
|---|---|---|
| Without | 325 | |
| ADK STAB LA 57 (RTM) + HOSTAVIN N 24 (RTM) | 4035 | 5020 |
| ADK STAB LA 57 (RTM) + ADK STAB LA 52 (RTM) | 3855 | 4985 |
| ADK STAB LA 57 (RTM) + GOODRITE UV 3150 (RTM) | 4320 | 4890 |
| ADK STAB LA 57 (RTM) + SANDUVOR PR-31 (RTM) | 3970 | 4430 |
| ADK STAB LA 57 (RTM) + Compound (B-7-1) | 3765 | 4475 |

*)The overall concentration of the light stabilizers is 0.20%.

The invention claimed is:

1. A stabilizer mixture containing the components (A) and (B) wherein component (A) is a compound of the formula (A-1-a), (A-2-a) or (A-2-b);

(A-1-a)

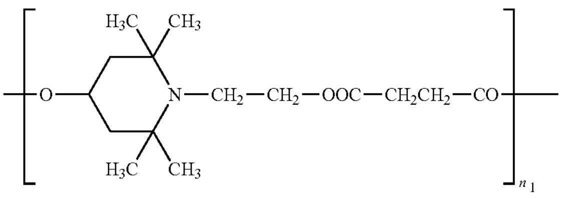

wherein $n_1$ is a number from 2 to 20;

(A-2-a)

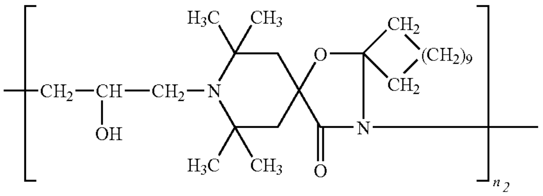

-continued (A-2-b)

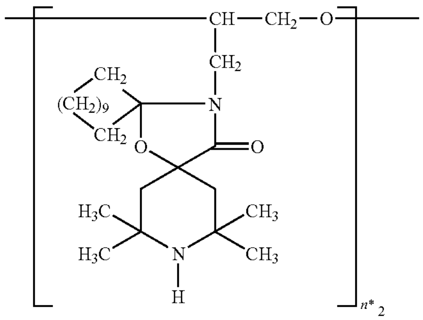

wherein $n_2$ and $n_2$* are a number from 2 to 20;

and component (B) is formed by two different compounds selected from the group consisting of compounds of the formulae (B-1-a), (B-1-b), (B-1-c), (B-1-d), (B-3-a), (B-3-b), (B-8-a) and (B-10-a);

(B-1-a)

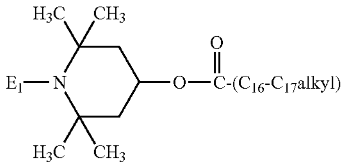

(B-1-b)

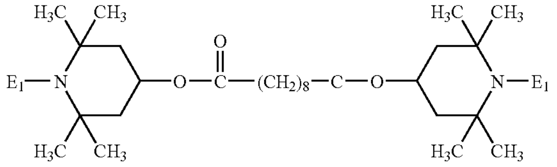

(B-1-c)

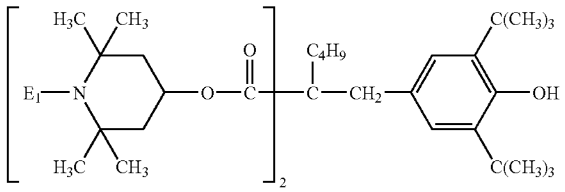

(B-1-d)

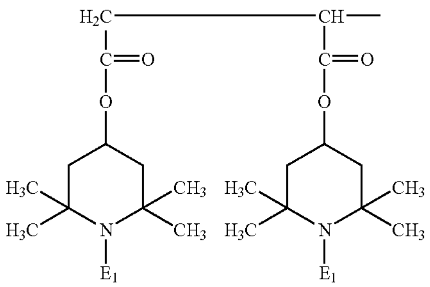

-continued

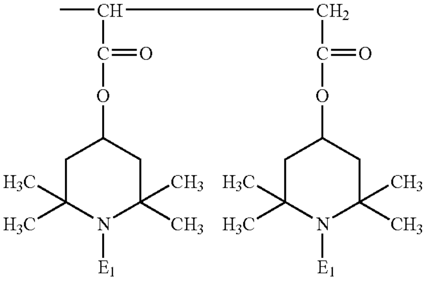

wherein $E_1$ is hydrogen, $C_1$-$C_8$alkyl, $O^-$, —OH, —$CH_2CN$, $C_1$-$C_{18}$alkoxy, $C_5$-$C_{12}$cycloalkoxy, $C_3$-$C_6$alkenyl, $C_7$-$C_9$phenylalkyl unsubstituted or substituted on the phenyl by 1, 2 or 3 $C_1$-$C_4$alkyl; or $C_1$-$C_8$acyl;

(B-3-a)

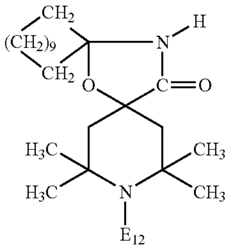

(B-3-b)

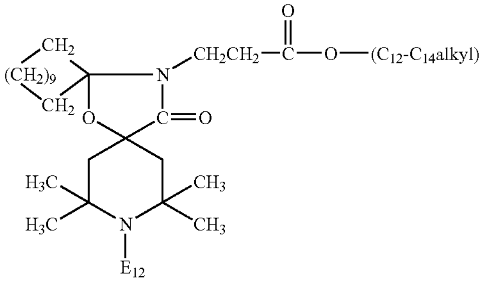

wherein $E_{12}$ has one of the meanings of $E_1$;

(B-8-a)

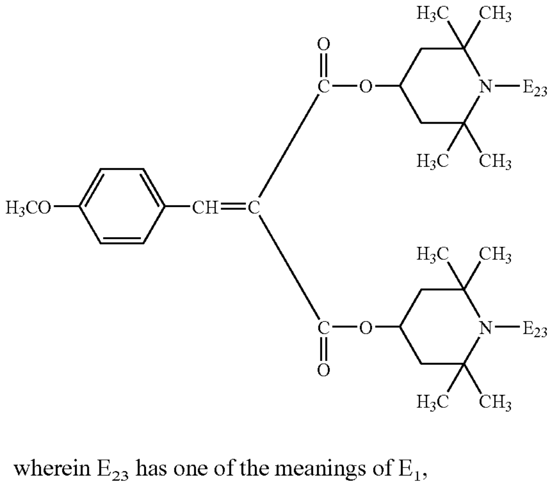

wherein $E_{23}$ has one of the meanings of $E_1$, (B-10-a)

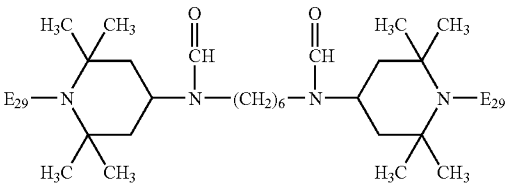

wherein $E_{29}$ has one of the meanings of $E_1$.

2. A stabilizer mixture according to claim 1 wherein $E_1$, $E_{12}$, $E_{23}$, and $E_{29}$ are hydrogen, $C_1$-$C_4$alkyl, $C_1$-$C_{10}$alkoxy, cyclohexyloxy, allyl, benzyl or acetyl.

3. A stabilizer mixture according to claim 1 wherein $E_1$, $E_{12}$, $E_{23}$ and $E_{29}$ are hydrogen or methyl and $E_1$ additionally is $C_1$-$C_8$alkoxy.

4. A stabilizer mixture according to claim 1 wherein one of the two different compounds forming component (B) is a compound of the formula (B-1-b) with $E_1$ being hydrogen.

5. A stabilizer mixture according to claim 1 wherein component (A) is a compound of the formula (A-1-a) with $n_1$ being a number from 2 to 20 or a compound of the formula (A-2-a) or (A-2-b) wherein $n_2$ and $n_2$* are a number from 2 to 20; and one of the two different compounds forming component (B) is a compound of the formula (B-1-b) with $E_1$ being hydrogen.

6. A stabilizer mixture according to claim 1 wherein component (A) is a compound of the formula (A-1-a) with $n_1$ being a number from 2 to 20 or a compound of the formula (A-2-a) or (A-2-b) wherein $n_2$ and $n_2$* are a number from 2 to 20;

one of the two different compounds forming component (B) is a compound of the formula (B-1-b) with $E_1$ being hydrogen; and the other of the two different compounds forming component (B) is a compound of the formula (B-1-a) with $E_1$ being hydrogen, (B-1-b) with $E_1$ being methyl, (B-1-d) with $E_1$ being hydrogen or methyl, (B-3-a) with $E_{12}$ being hydrogen, (B-3-b) with $E_{12}$ being hydrogen or (B-8-a) with $E_{23}$ being methyl.

7. A stabilizer mixture according to claim 1 wherein component (A) is a compound of the formula (A-1-a) with $n_1$ being a number from 2 to 20, component (B) is a compound of the formula (B-1-b) wherein $E_1$ is hydrogen, and component (C) is a compound of the formula (B-1-b) wherein $E_1$ is octyloxy; or component (A) is a compound of the formula (A-1-a) with $n_1$ being a number from 2 to 20, component (B) is a compound of the formula (B-1-b) wherein $E_1$ is hydrogen, and component (C) is a compound of the formula (B-3-a) wherein $E_{12}$ is hydrogen; or component (A) is a compound of the formula (A-1-a) with $n_1$ being a number from 2 to 20, component (B) is a compound of the formula (B-1-b) wherein $E_1$ is hydrogen, and component (C) is a compound of the formula (B-1-d) wherein $E_1$ is hydrogen; or component (A) is a compound of the formula (A-1-a) with $n_1$ being a number from 2 to 20, component (B) is a compound of the formula (B-1-b) wherein $E_1$ is hydrogen, and component (C) is a compound of the formula (B-1-a) wherein $E_1$ is hydrogen; or component (A) is a compound of the formula (A-1-a) with $n_1$ being a number from 2 to 20, component (B) is a compound of the formula (B-1-b) wherein $E_1$ is methyl, and component (C) is a compound of the formula (B-1-d) wherein $E_1$ is methyl.

8. A composition comprising an organic material subject to degradation induced by light, heat or oxidation and a stabilizer mixture according to claim 1.

9. A composition according to claim 8 wherein the organic material is a synthetic polymer.

10. A composition according to claim 8 wherein the organic material is a polyolefin.

11. A composition according to claim 8 wherein the organic material is polyethylene, polypropylene, a polyethylene copolymer or a polypropylene copolymer.

12. A method for stabilizing an organic material against degradation induced by light, heat or oxidation, which comprises incorporating into the organic material a stabilizer mixture according to claim 1.

* * * * *